(12) United States Patent
Wilson et al.

(10) Patent No.: US 8,390,993 B1
(45) Date of Patent: Mar. 5, 2013

(54) LIGHT SOURCE IN CHASSIS TO PROVIDE FRONTAL ILLUMINATION OF A FACEPLATE ON THE CHASSIS

(75) Inventors: Colin J. Wilson, Sebastapol, CA (US); Stephen J. West, Petaluma, CA (US)

(73) Assignee: Cyan, Inc., Petaluma, CA (US)

( * ) Notice: Subject to any disclaimer, the term of this patent is extended or adjusted under 35 U.S.C. 154(b) by 920 days.

(21) Appl. No.: 12/210,204

(22) Filed: Sep. 14, 2008

Related U.S. Application Data

(63) Continuation-in-part of application No. 12/148,281, filed on Apr. 16, 2008.

(51) Int. Cl.
*G06F 1/16* (2006.01)
*F21V 7/04* (2006.01)

(52) U.S. Cl. .............. 361/679.02; 340/815.45; 362/602; 362/612; 362/630; 362/631; 362/632; 362/633; 362/634

(58) Field of Classification Search .......... 362/600–634; 361/600–837; 340/815.45
See application file for complete search history.

(56) References Cited

U.S. PATENT DOCUMENTS

| | | | |
|---|---|---|---|
| 3,681,665 A | 8/1972 | Olds et al. | |
| 5,594,576 A | 1/1997 | Sutherland et al. | |
| 6,494,593 B2 * | 12/2002 | An et al. | 362/235 |
| 6,606,427 B1 | 8/2003 | Graves et al. | |
| 6,668,106 B1 | 12/2003 | Levine et al. | |
| 6,760,339 B1 | 7/2004 | Noel et al. | |
| 6,816,590 B2 | 11/2004 | Pike et al. | |
| 6,861,943 B2 | 3/2005 | Pike et al. | |
| 6,931,211 B2 | 8/2005 | English et al. | |
| 6,947,623 B2 | 9/2005 | Ramaswami et al. | |
| 7,013,084 B2 | 3/2006 | Battou et al. | |
| 7,079,381 B2 | 7/2006 | Brehm et al. | |
| 7,079,485 B1 | 7/2006 | Lau et al. | |
| 7,099,271 B2 | 8/2006 | Friesen et al. | |
| 7,127,171 B2 | 10/2006 | Martin et al. | |
| 7,209,477 B2 | 4/2007 | Pike | |
| 7,218,640 B2 | 5/2007 | Lebizay et al. | |
| 7,242,867 B1 | 7/2007 | Clouinard | |
| 7,251,256 B1 | 7/2007 | Barry et al. | |
| 7,263,290 B2 | 8/2007 | Fortin et al. | |
| 7,272,309 B1 | 9/2007 | Tamil et al. | |
| 7,289,436 B2 | 10/2007 | Schaller et al. | |
| 7,460,482 B2 | 12/2008 | Pike | |
| 7,466,924 B2 | 12/2008 | English et al. | |
| 7,539,184 B2 | 5/2009 | Campini et al. | |
| 7,619,886 B2 | 11/2009 | Soetemans et al. | |
| 7,644,215 B2 | 1/2010 | Wallace et al. | |

(Continued)

OTHER PUBLICATIONS

U.S. Appl. No. 12/148,281, filed Apr. 16, 2008 by Stephen J. West et al., 65 pages.

(Continued)

*Primary Examiner* — William Carter
(74) *Attorney, Agent, or Firm* — Silicon Valley Patent Group LLP; Omkar Suryadevara

(57) ABSTRACT

A shelf of communication equipment provides frontal illumination of a face plate of the shelf. Specifically, a shelf in a rack in a communication network includes a face plate and a bezel. The face plate has a first exterior surface that carries a legend. The bezel forms a second exterior surface extending in a predetermined direction transverse to the first exterior surface. For example, if the first exterior surface is vertical, the second exterior surface is horizontal and overhangs the first exterior surface. During operation, electromagnetic radiation generated by a source enclosed by the bezel exits through the second exterior surface and directly illuminates at least the legend, and optionally also illuminates a electronic device adjacent to the legend, such as an LED or a jack, if such a device is present on the first exterior surface.

16 Claims, 26 Drawing Sheets

U.S. PATENT DOCUMENTS

| | | | |
|---|---|---|---|
| 7,653,052 B2 | 1/2010 | Pike et al. | |
| 7,693,976 B2 | 4/2010 | Perry et al. | |
| 7,707,304 B1 | 4/2010 | Lolayekar et al. | |
| 7,710,866 B2 | 5/2010 | Soetemans et al. | |
| 7,796,501 B2 | 9/2010 | Oltman et al. | |
| 7,801,120 B2 | 9/2010 | Steinmetz et al. | |
| 7,818,387 B1 | 10/2010 | King et al. | |
| 7,821,790 B2 | 10/2010 | Sharma et al. | |
| 7,852,781 B1 | 12/2010 | Felton et al. | |
| 7,918,599 B2 * | 4/2011 | Chang | 362/615 |
| 2002/0176131 A1 | 11/2002 | Walters et al. | |
| 2003/0033409 A1 | 2/2003 | King et al. | |
| 2003/0081624 A1 | 5/2003 | Aggarwal et al. | |
| 2003/0101426 A1 | 5/2003 | Sarkinen et al. | |
| 2003/0210870 A1 | 11/2003 | Graves | |
| 2004/0264128 A1 | 12/2004 | Crippen et al. | |
| 2006/0248761 A1 * | 11/2006 | Cheung et al. | 40/564 |
| 2006/0279946 A1 * | 12/2006 | Park et al. | 362/97 |
| 2007/0004468 A1 * | 1/2007 | Boros | 455/574 |
| 2008/0158906 A1 * | 7/2008 | Park et al. | 362/606 |
| 2008/0160899 A1 | 7/2008 | Henry et al. | |
| 2009/0257751 A1 | 10/2009 | Sadananda et al. | |
| 2010/0064169 A1 | 3/2010 | Davies et al. | |
| 2010/0166422 A1 | 7/2010 | Shanbhag et al. | |
| 2011/0069954 A1 | 3/2011 | Hu et al. | |

OTHER PUBLICATIONS

Office Action in U.S. Appl. No. 12/148,281, dated Feb. 8, 2011, 6 pages.
Response in U.S. Appl. No. 12/148,281, dated Mar. 8, 2011, 1 page.
Office Action in U.S. Appl. No. 12/148,281, dated Apr. 1, 2011, 11 pages.
Amendment in U.S. Appl. No. 12/148,281, dated Jul. 1, 2011, 7 page.
Notice of Allowance in U.S. Appl. No. 12/148,281, dated Aug. 4, 2011, 6 pages.
Request for Continued Examination in U.S. Appl. No. 12/148,281, dated Nov. 4, 2011, 6 pages.
Notice of Allowance in U.S. Appl. No. 12/148,281, dated Nov. 23, 2011, 10 pages.
Amendment after Notice of Allowance in U.S. Appl. No. 12/148,281, dated Feb. 23, 2012, 8 pages.
Response to Amendment under Rule 312 in U.S. Appl. No. 12/148,281, dated Mar. 7, 2012, 2 pages.
U.S. Appl. No. 13/405,330, filed Feb. 26, 2012 by Stephen J. West et al., 74 pages.
Advanced TCA, PICMG 3.0 Short Form Specification, Jan. 2003, pp. 34.
PICMG® 3—Frequently Asked Questions, compiled by PICMG President Joe Pavlat, believed to be prior to Sep. 14, 2008, pp. 7.

* cited by examiner

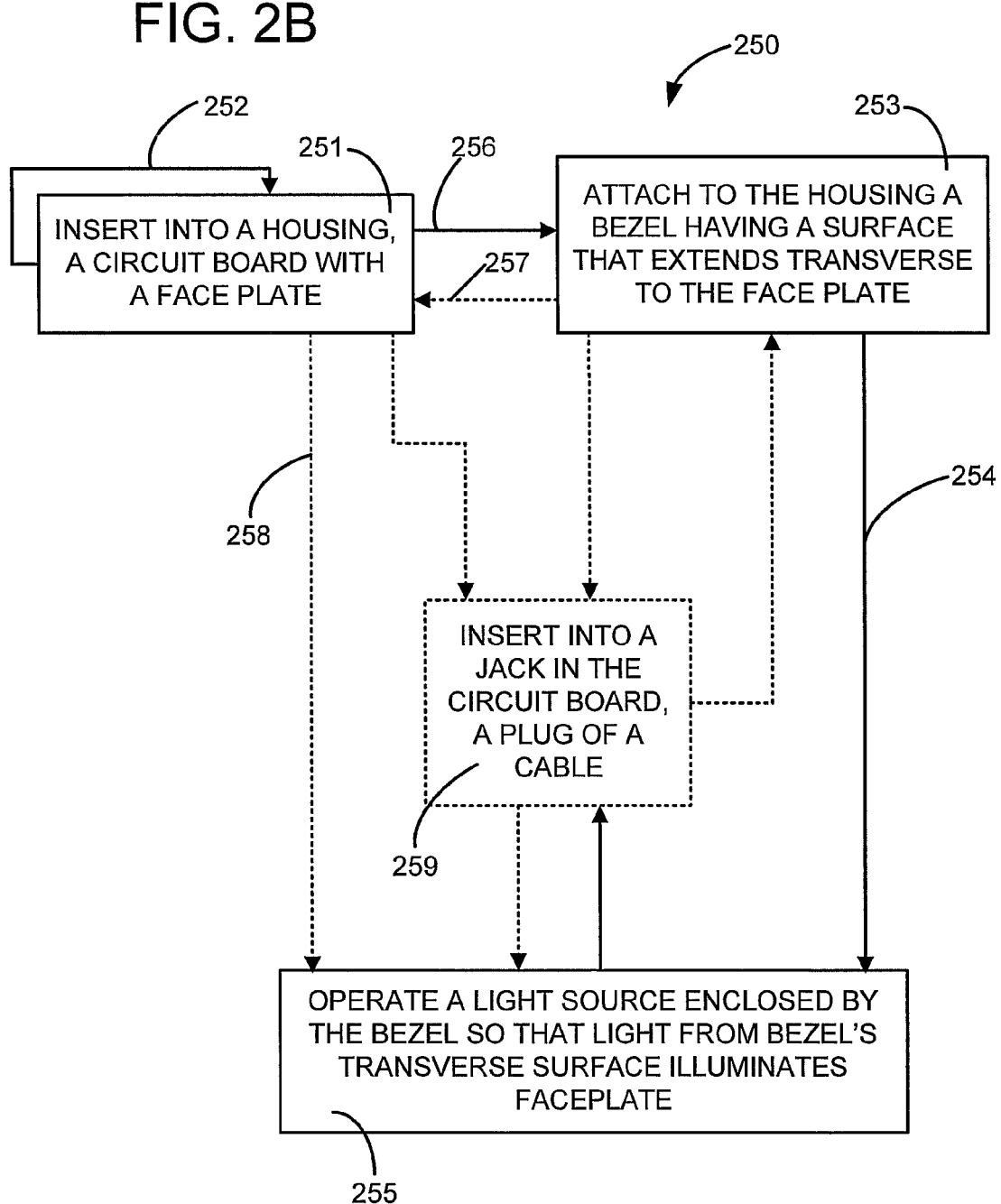

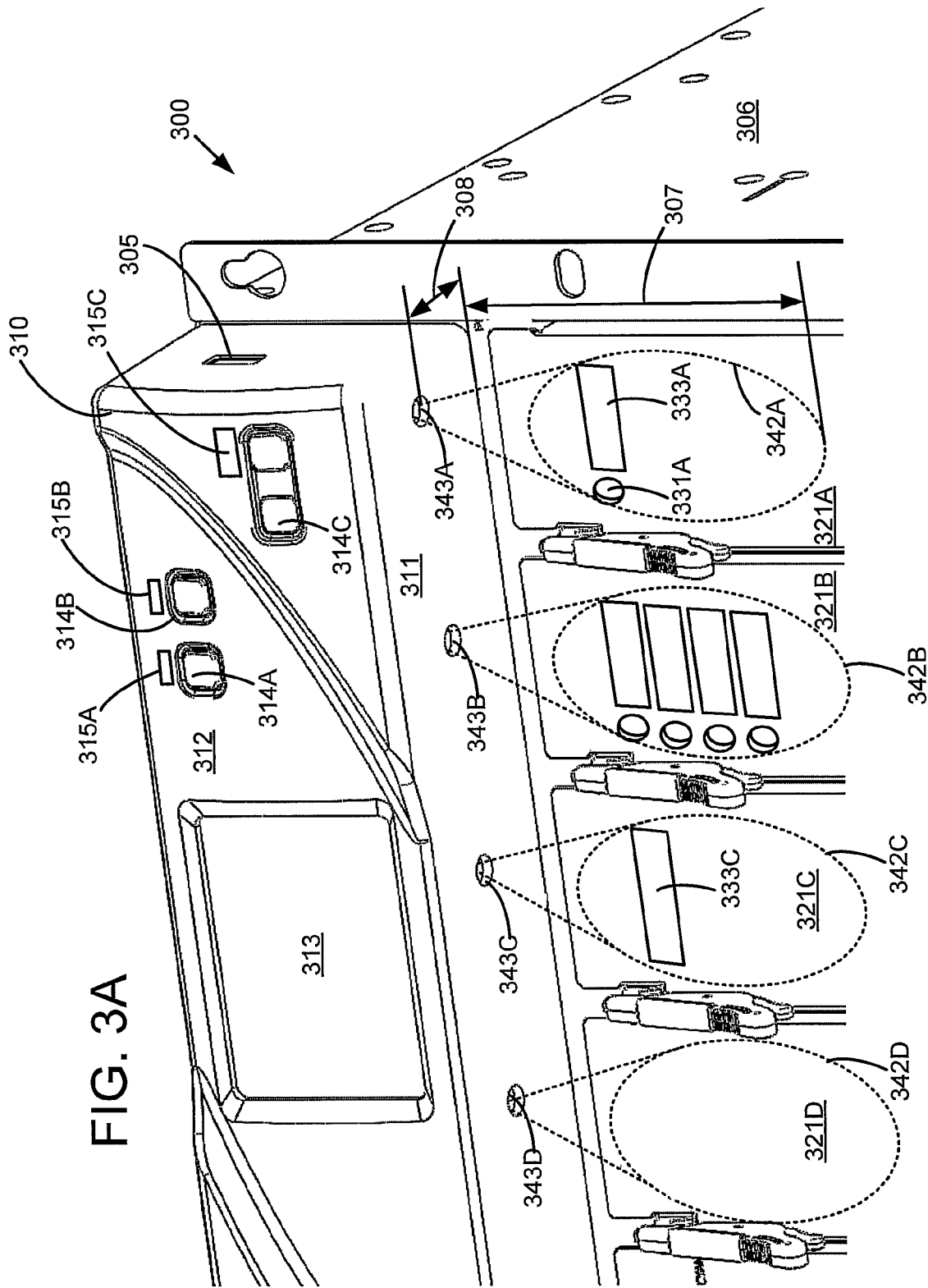

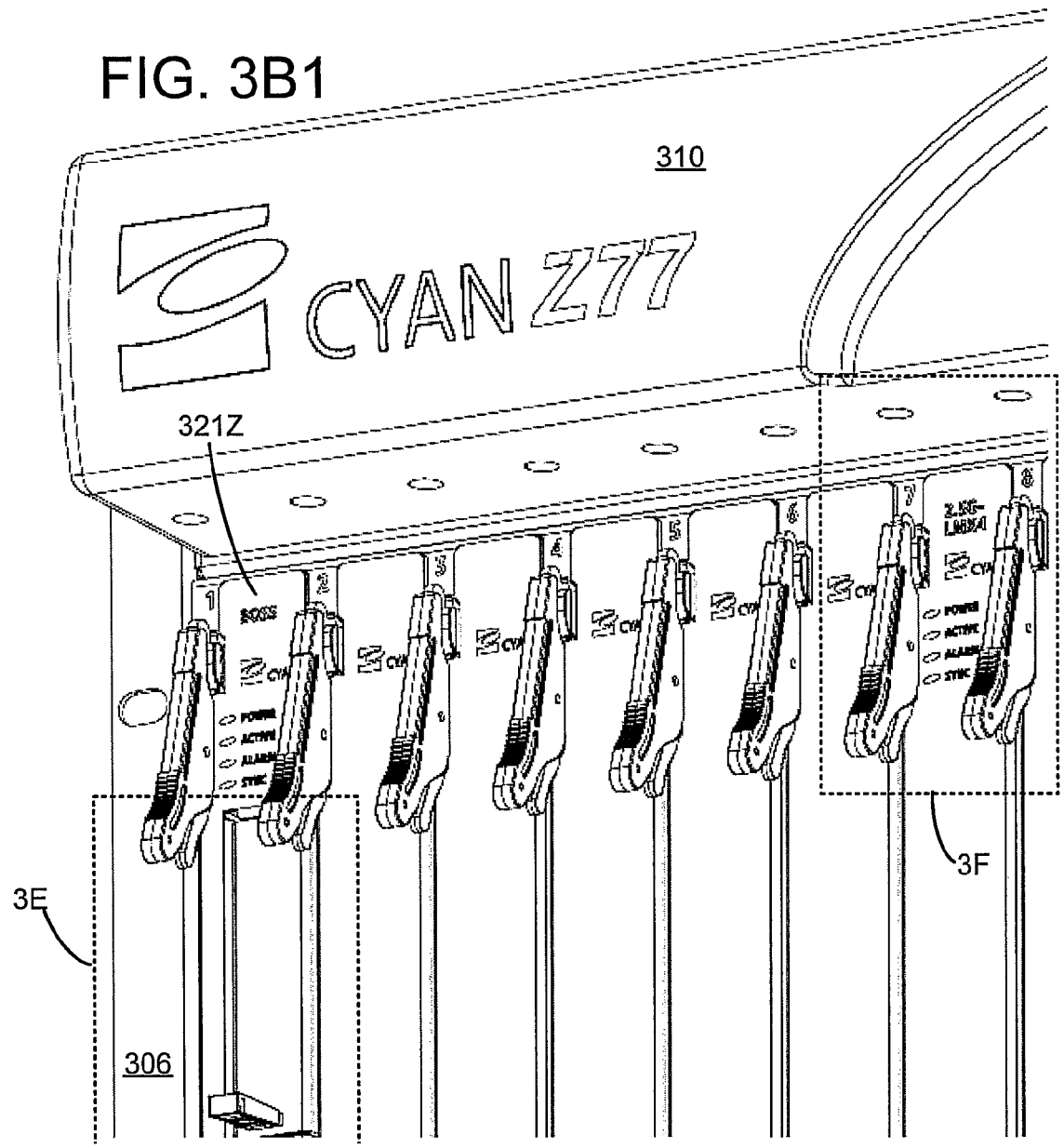

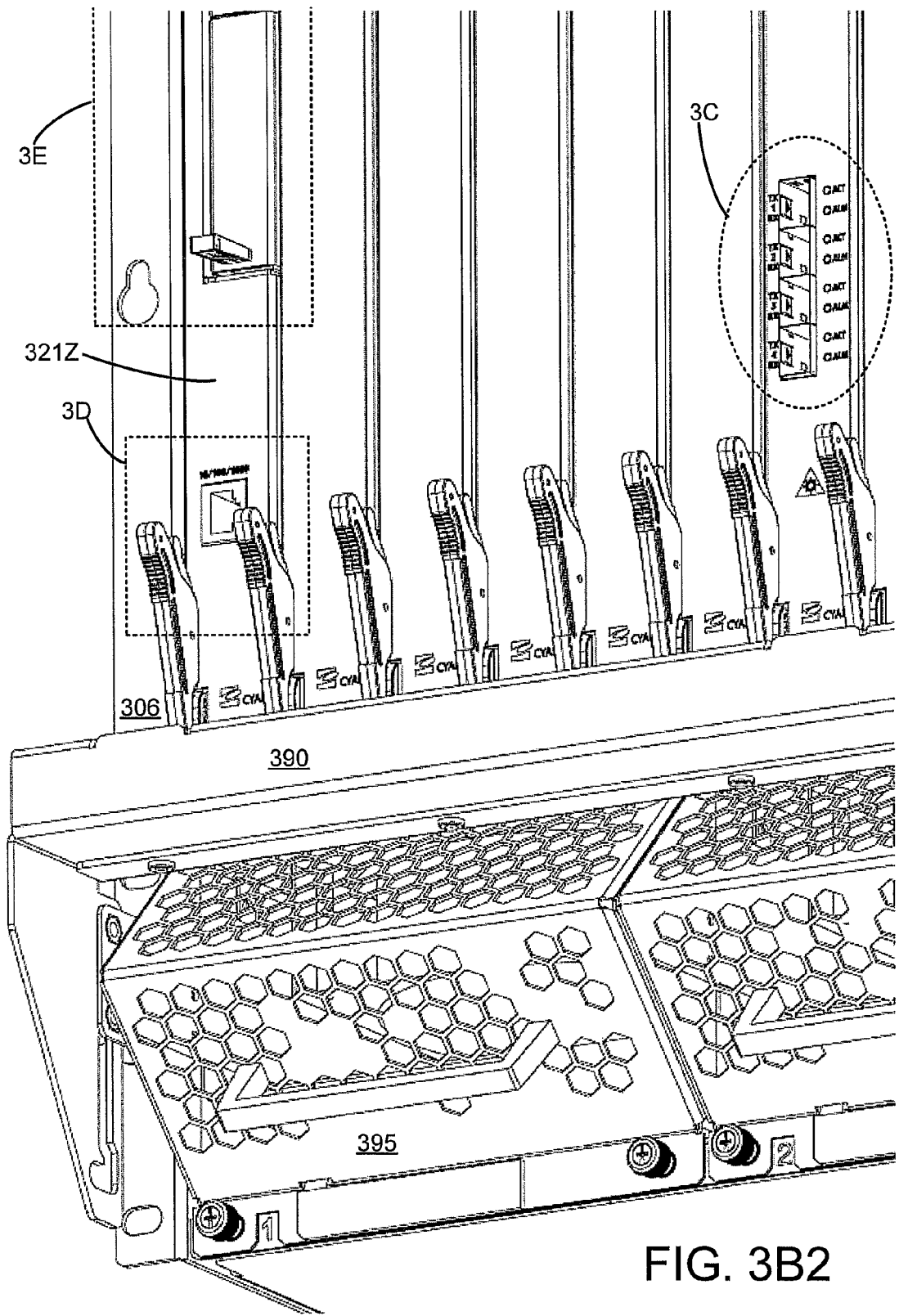
FIG. 3B2

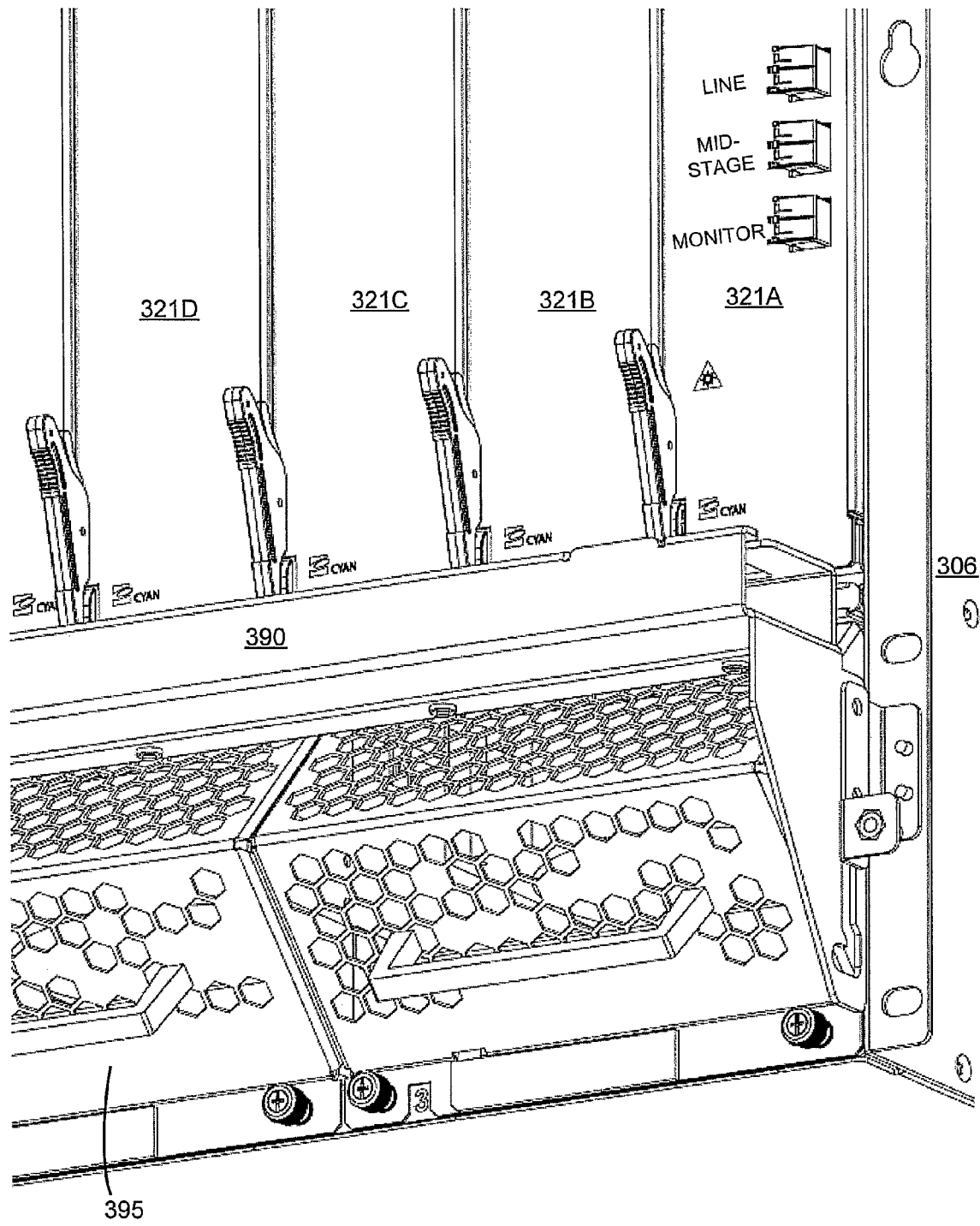
FIG. 3B3

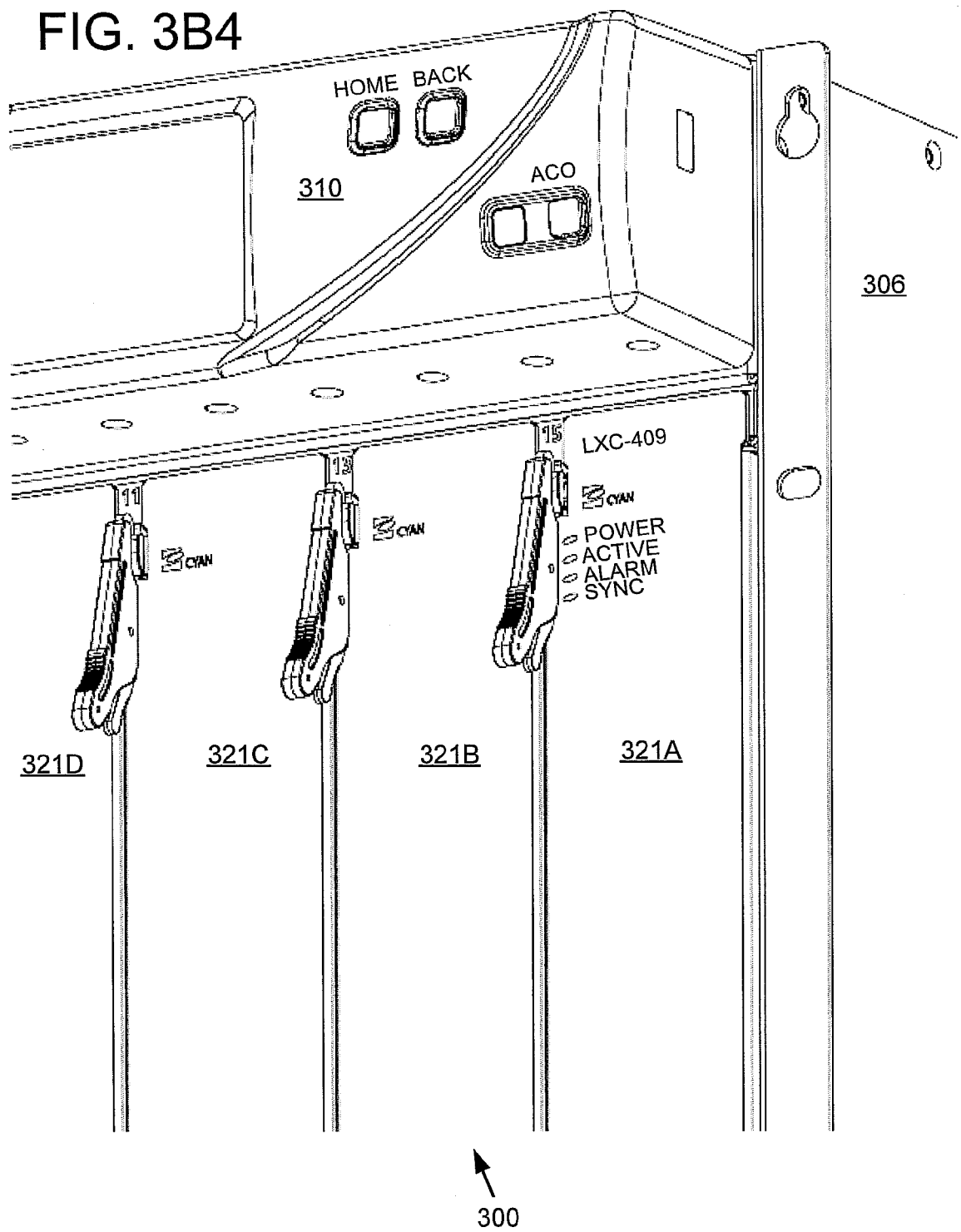

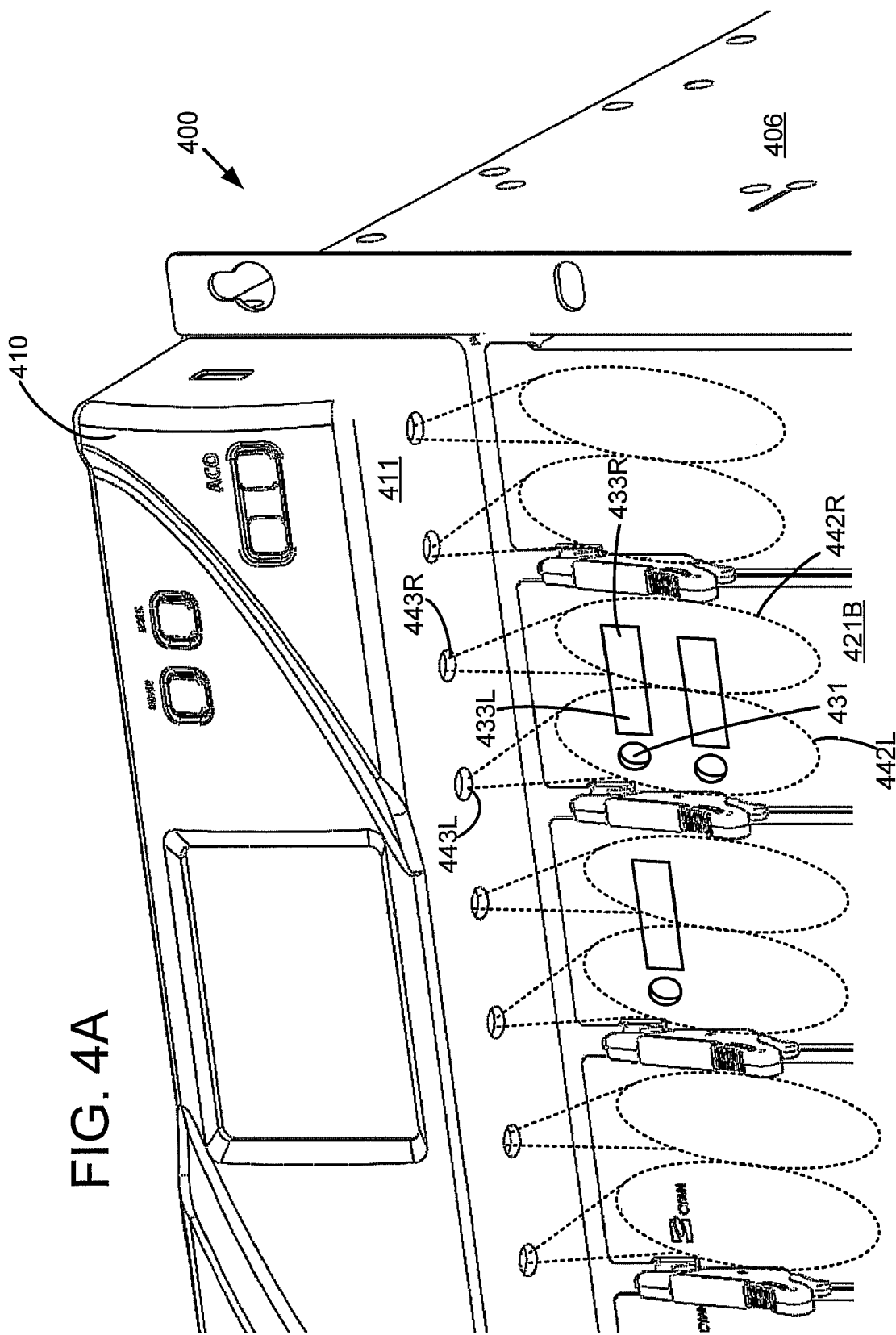

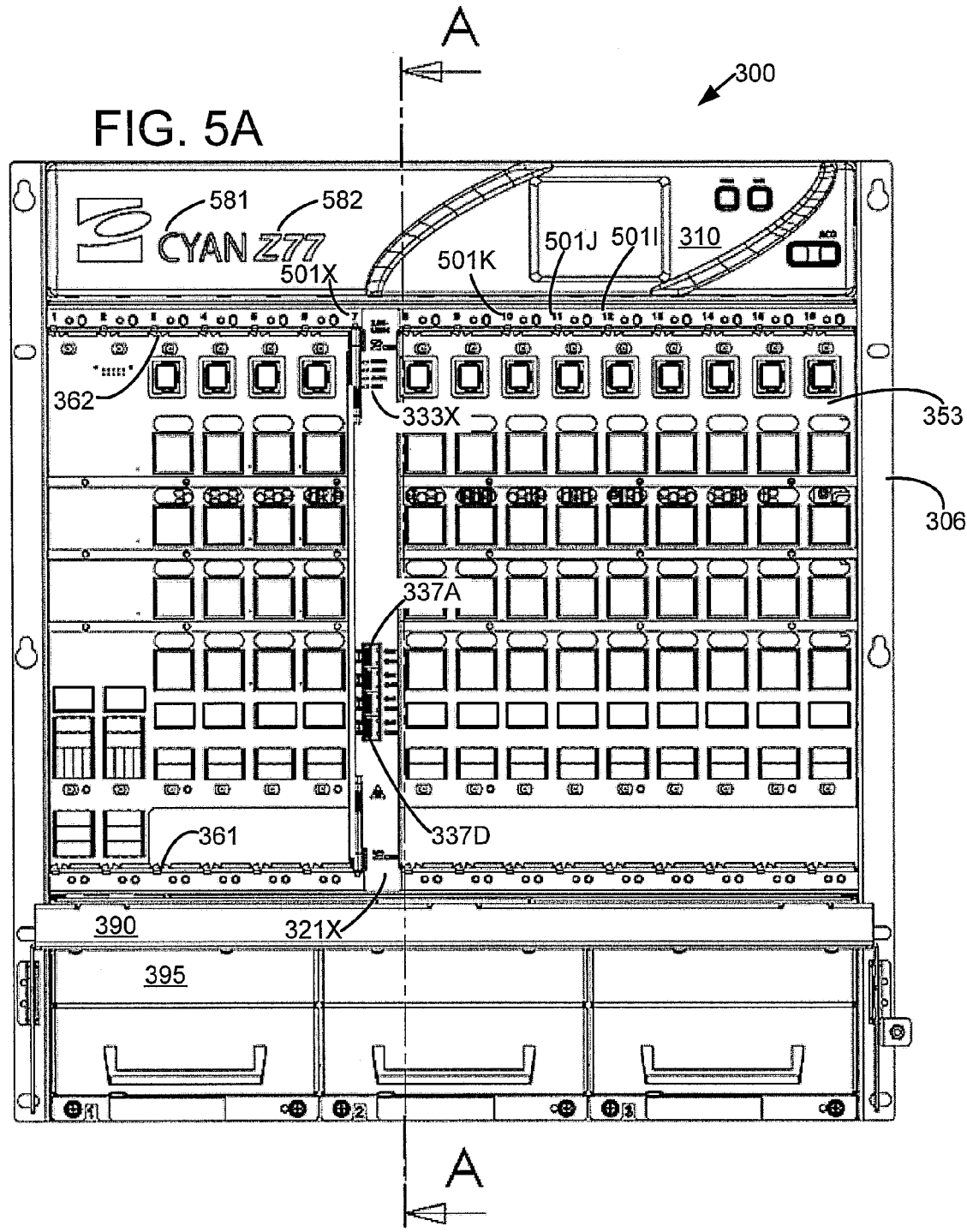

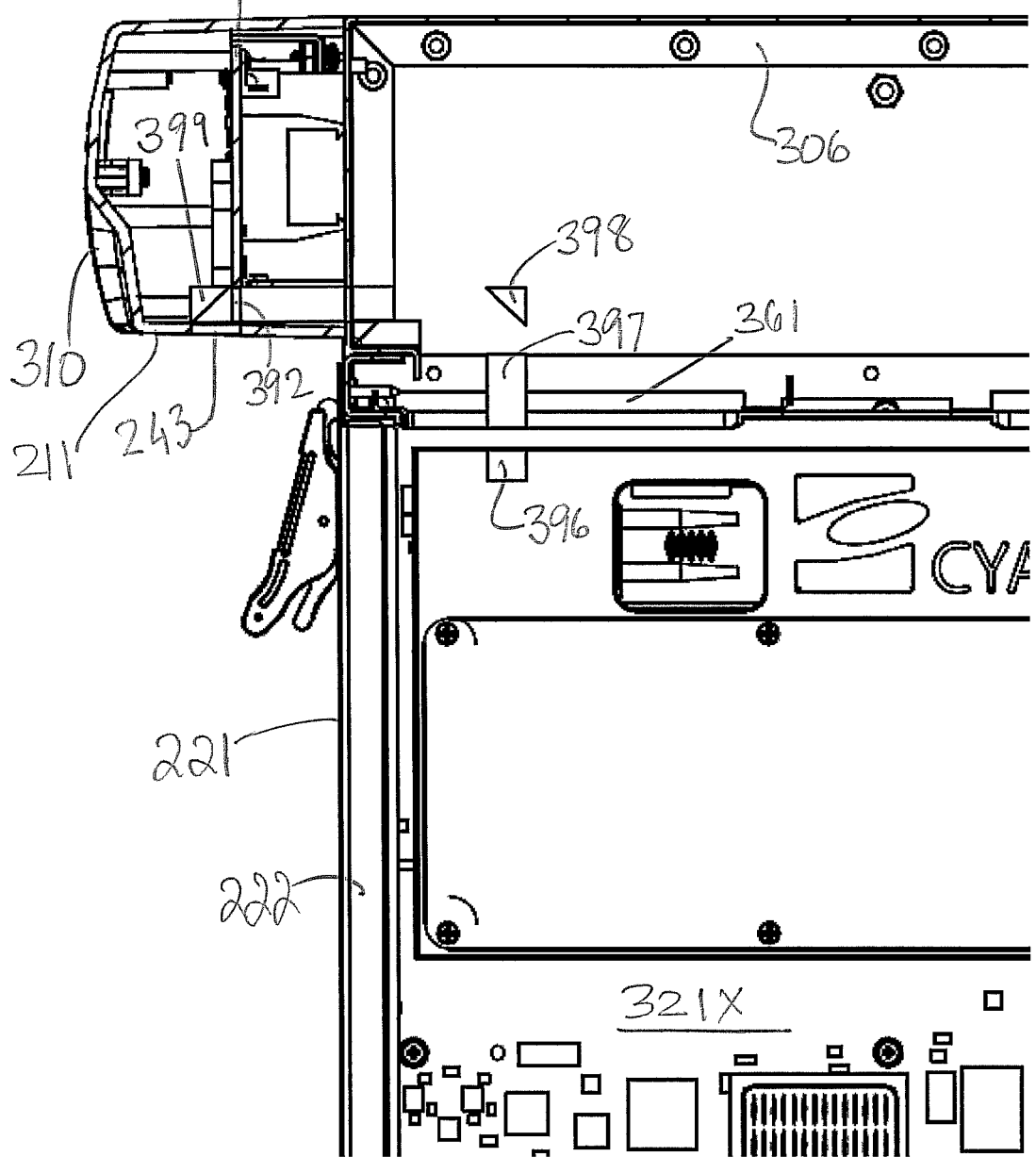

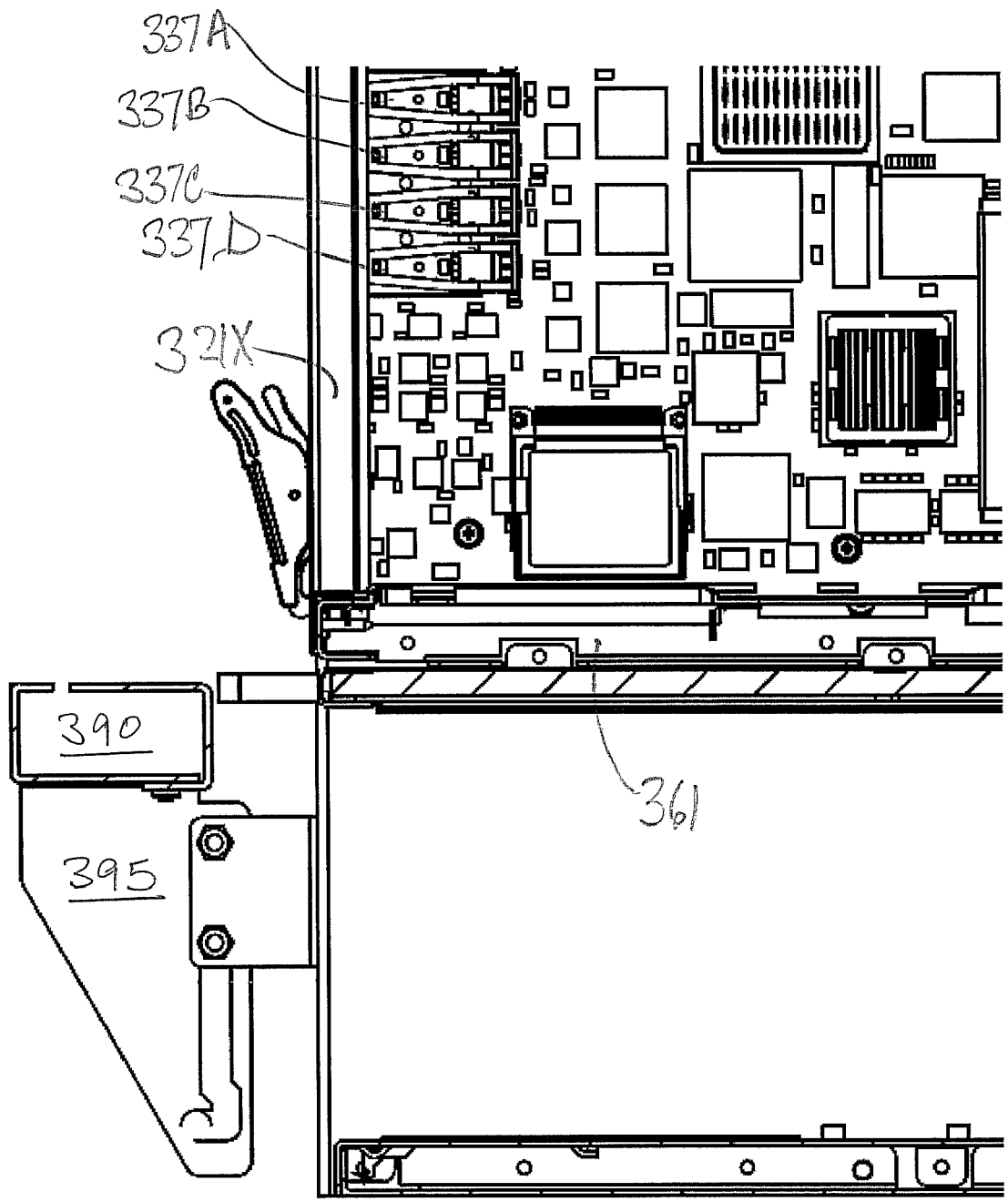
FIG. 5B2

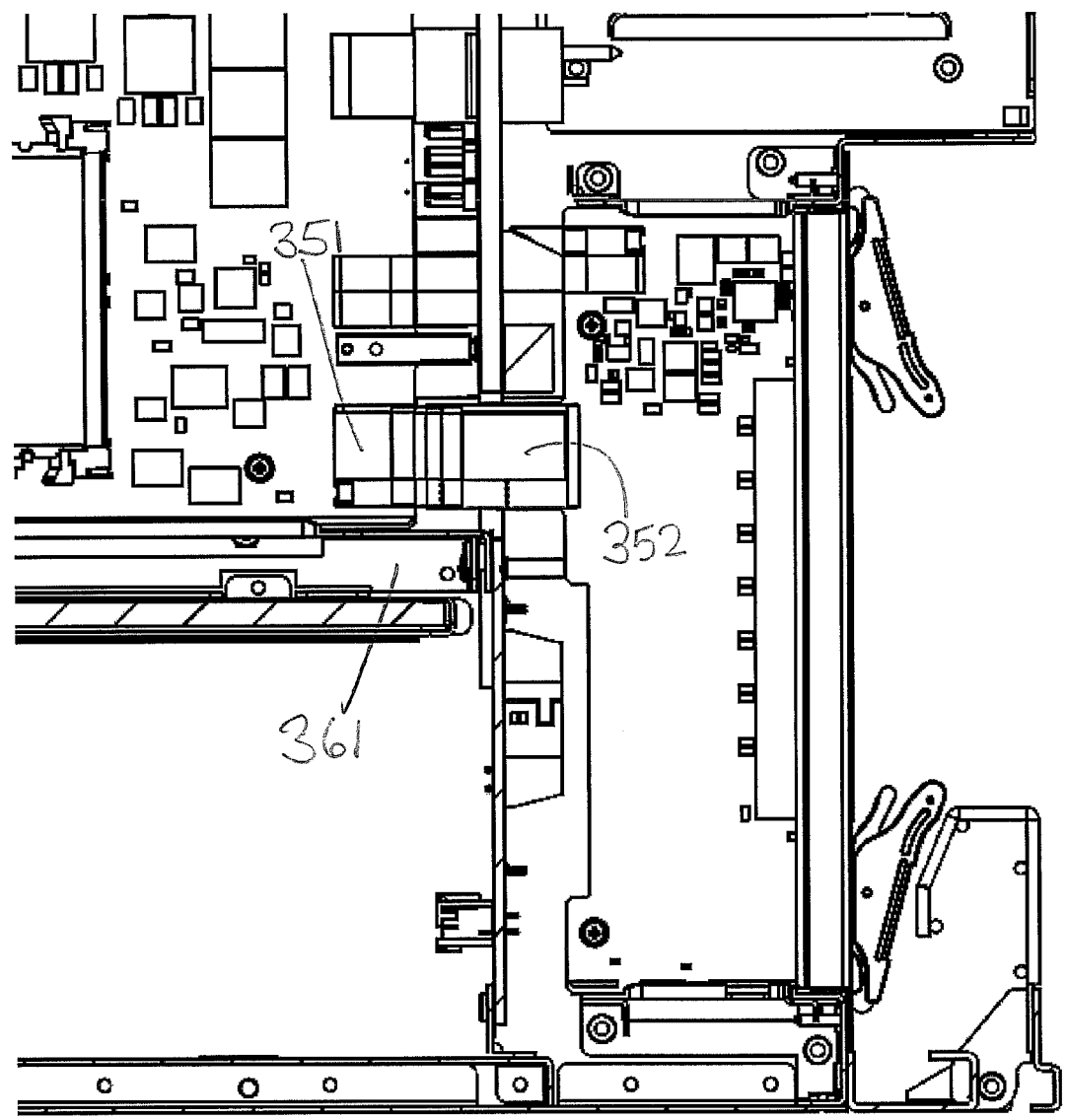
FIG. 5B3

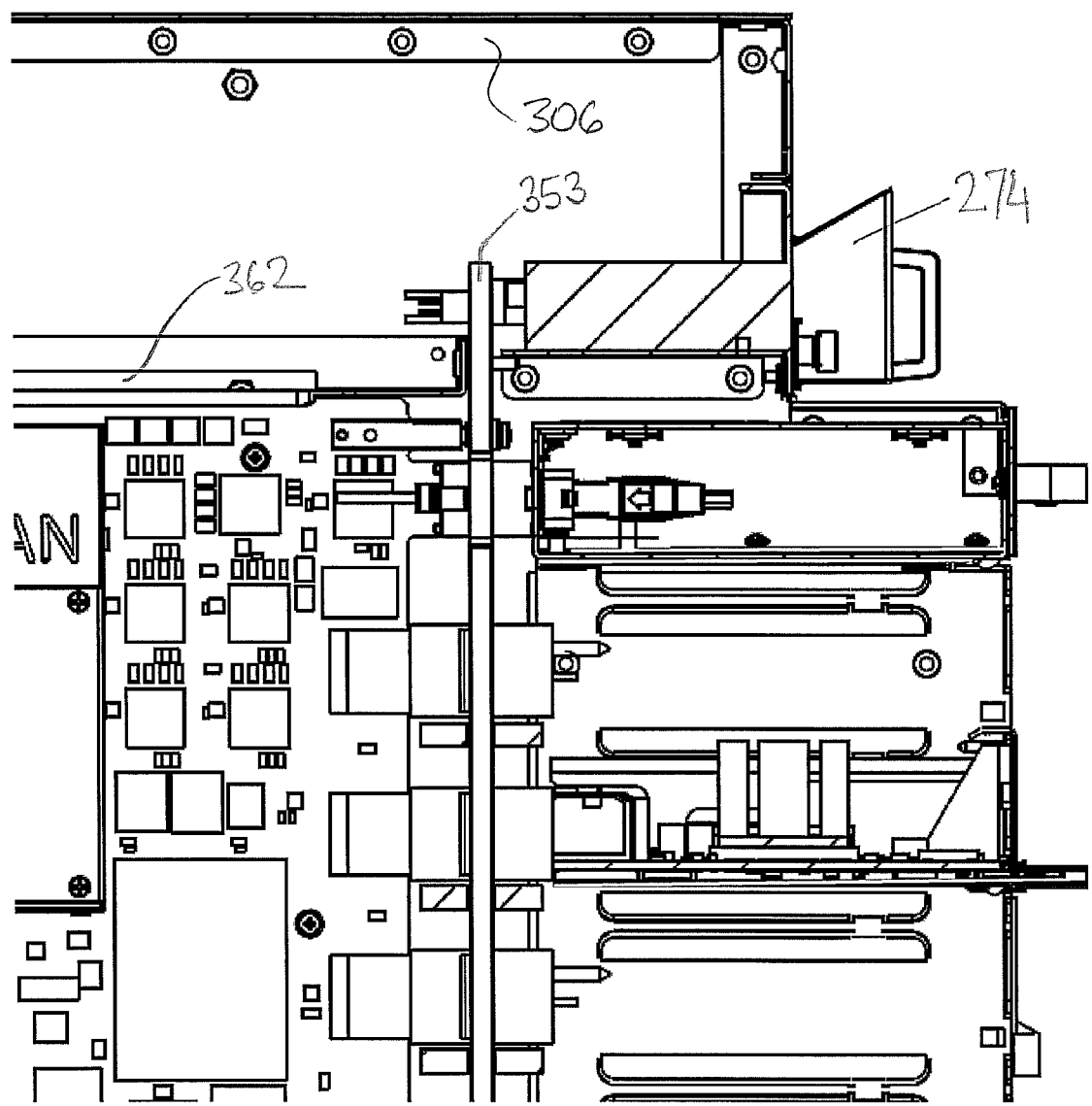
FIG. 5B4

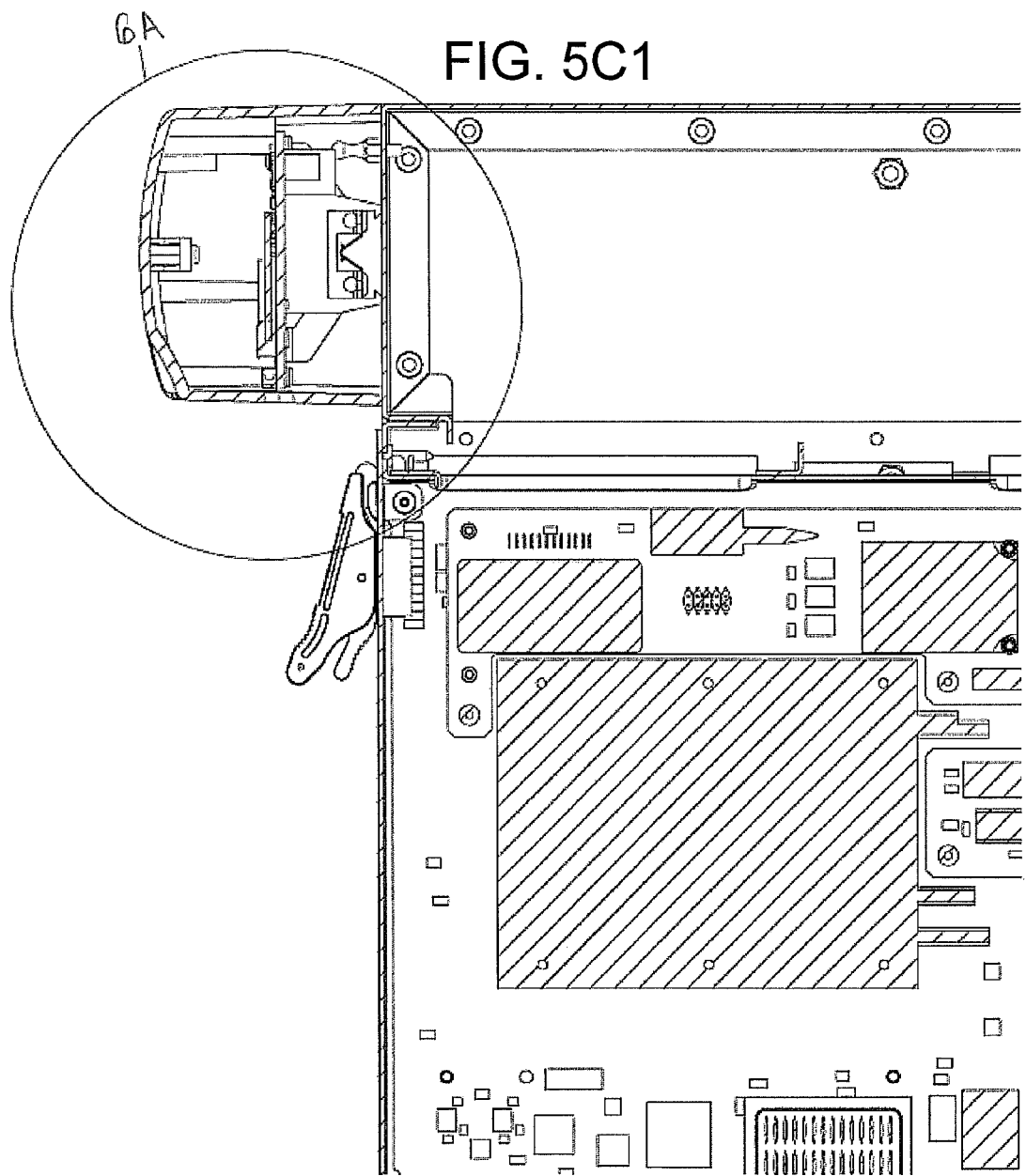

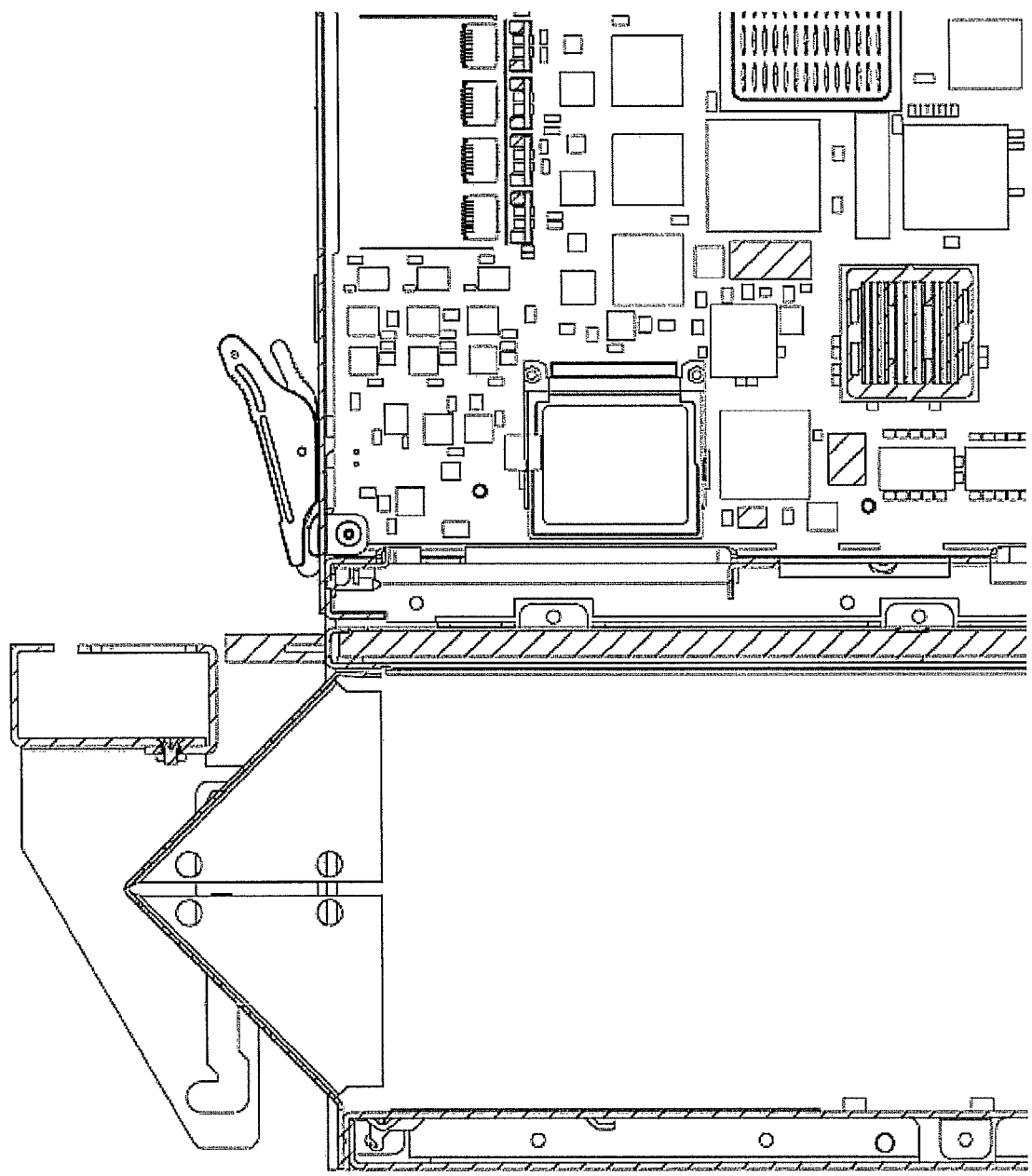
FIG. 5C2

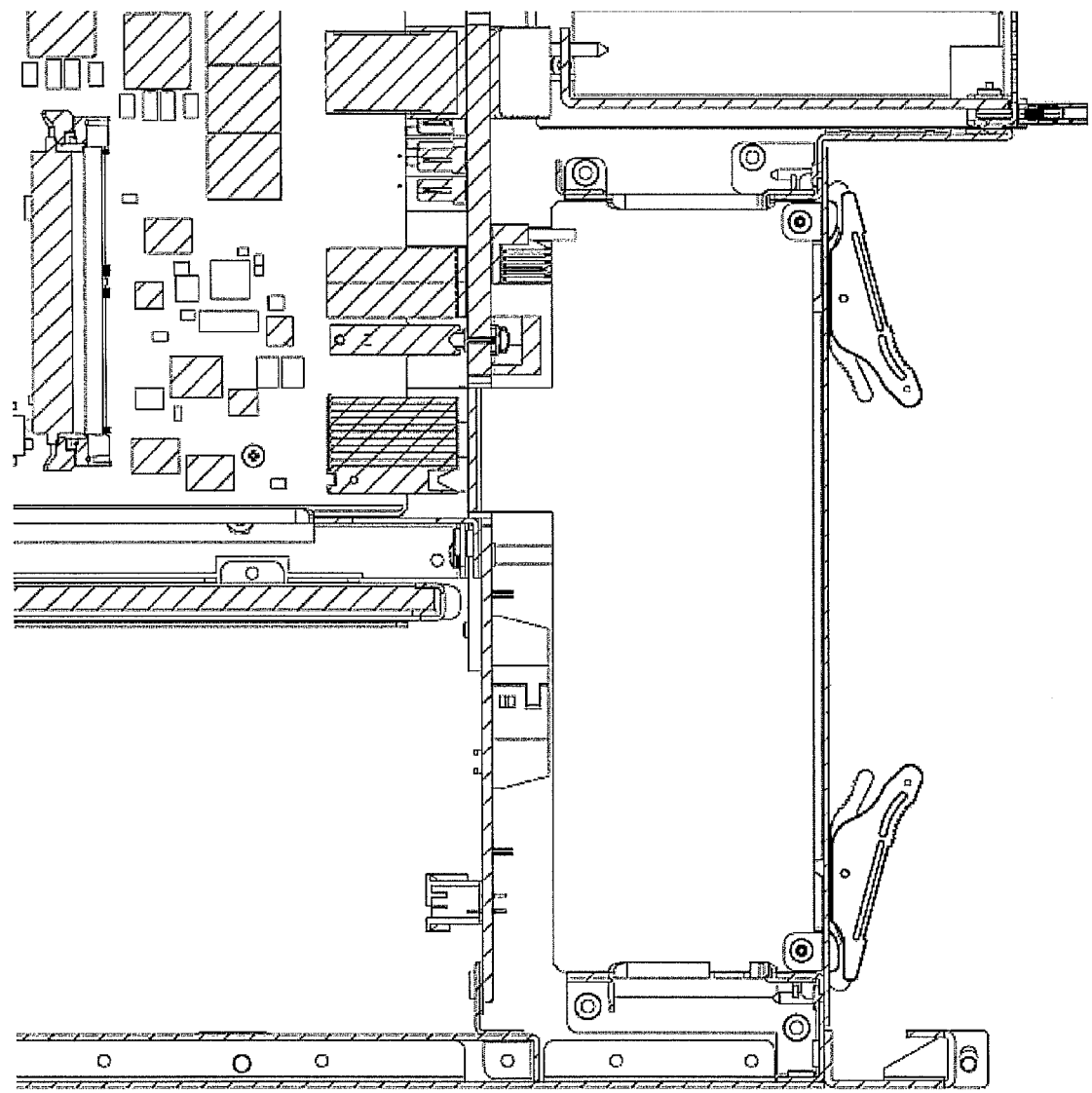
FIG. 5C3

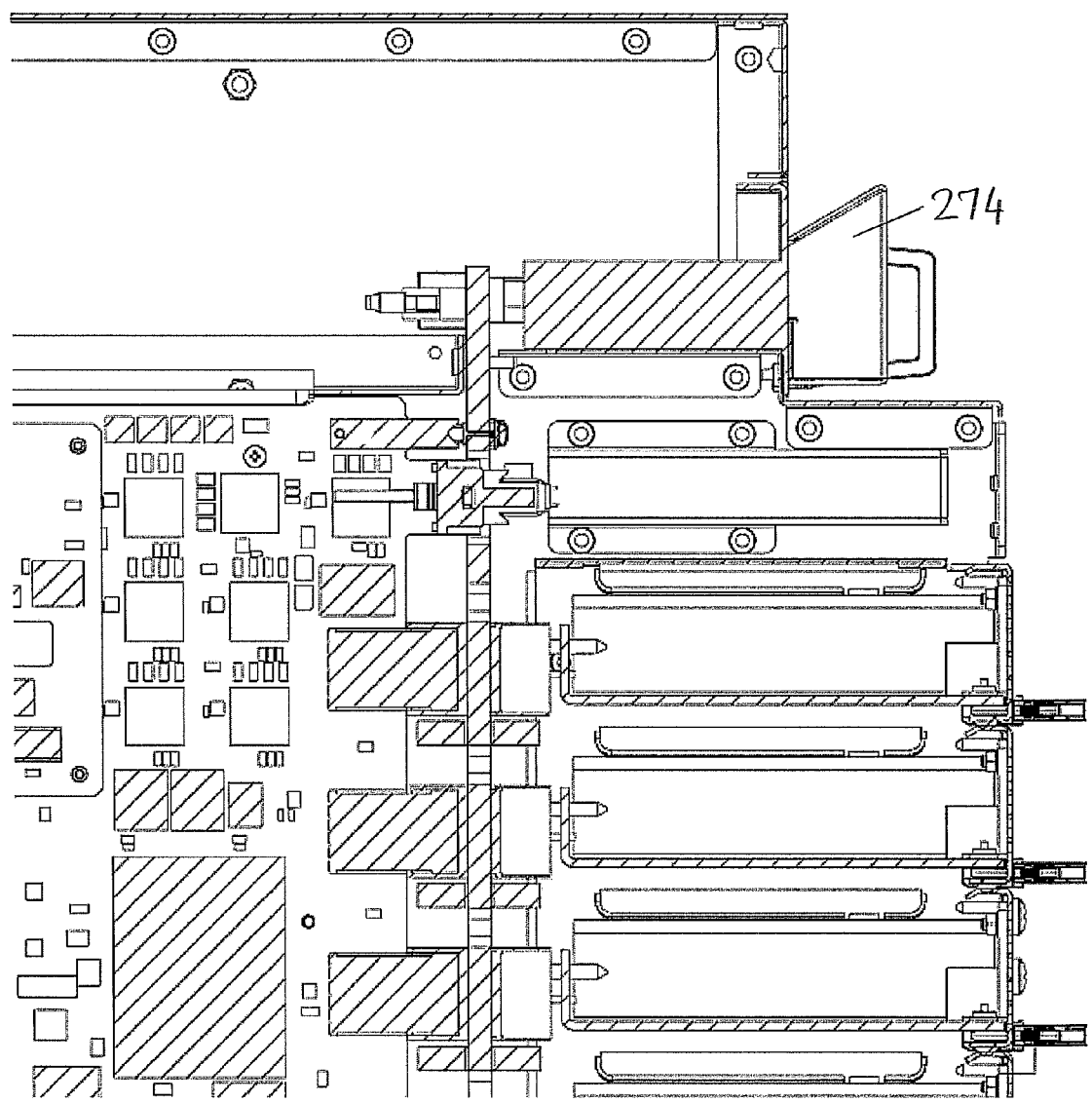
FIG. 5C4

LIGHT SOURCE IN CHASSIS TO PROVIDE FRONTAL ILLUMINATION OF A FACEPLATE ON THE CHASSIS

CROSS REFERENCE TO PARENT APPLICATION

This application is a continuation-in-part application of U.S. patent application Ser. No. 12/148,281 filed on Apr. 16, 2008 by Stephen J. West as the first named inventor, entitled "MULTI-FABRIC SHELF FOR A TRANSPORT NETWORK", which is incorporated by reference herein in its entirety.

BACKGROUND

Communication networks are built of nodes (such as switches, routers, and servers) that are located in facilities typically referred to as central offices (of telephone companies) and data centers (of IT service providers). Each facility constitutes a room in a building, the room holding rows of racks, each rack holding a number of shelves, each shelf holding several printed circuit boards of a node (also called "network element"). Within any given facility, each shelf has width and depth sufficient to fit within a rack of dimensions that are standardized depending on whether the facility is a data center or a telco central office.

For example, a telco rack 110 (FIG. 1) may be a seven foot tall open frame consisting of two posts 111 and 112 separated from each other by 23 inches or 600 mm, mounted on a base 114 and connected at the top by a cross-bar 113. A number of such racks (three are shown in FIG. 1 for illustration, although there are more) usually bolted to the floor of the room, adjacent to one another in a row. Adjacent rows in a room are separated from each other by distances that are of the same order as frame width (e.g. 2 to 3 feet). The just-described inter-row distances are kept small to minimize overhead of the facility (for example, for power backup via a diesel generator and security via human guards).

A shelf 100 (FIG. 1), of such a telco rack or cabinet may conform to Advanced Telecom Computing Architecture (ATCA), a series of industry specification standards for next generation carrier grade communications equipment, such as ATCA 3.0. The ATCA specification defines the physical and electrical characteristics, such as rack and shelf form factors, power, cooling, management interfaces, and the electromechanical specification of ATCA-compliant boards. Such a shelf (also called "chassis") may hold sixteen printed circuit boards in the front of each shelf, each PCB typically supporting one or more integrated circuit (IC) chips, such as processors, switches, traffic managers, memories, and optionally one or more transceivers. Each printed circuit board has a face plate that forms a portion of a front surface of the shelf. The face plate has openings to accommodate light emitting diodes (LEDs) that are also supported on the printed circuit board. The face plate may carry a legend adjacent to the opening of each LED.

Instead of LEDs, it is also known in the prior art to use a translucent plastic strip as a face plate that has light incident from the back, for example as described in U.S. Pat. No. 3,681,665 which is incorporated by reference herein in its entirety as background.

The inventors of the current patent application believe that there is a need to improve back lit face plates of prior art chassis.

SUMMARY

In accordance with the invention, a shelf (also called "chassis") for use in a rack of equipment in a communication network includes a source of electromagnetic radiation to provide frontal illumination of a face plate on the shelf. Specifically, in several embodiments of the invention, a chassis of electronic equipment includes a face plate. The face plate has an exterior surface, with a legend. The chassis of the just-described embodiments additionally includes a bezel that forms another exterior surface extending in a predetermined direction transverse to the face plate's exterior surface. For example, if the face plate's exterior surface is vertical, the bezel's exterior surface is horizontal and overhangs the face plate's exterior surface. The bezel of the just-described embodiments encloses at least one source of electromagnetic radiation, for example a light emitting diode.

During operation, electromagnetic radiation generated by the source exits the bezel through its exterior surface and illuminates at least the legend on the face plate's exterior surface. Frontal illumination of a face plate by a source within the shelf improves visibility and legibility of legend(s) on the face plate independent of environmental lighting. For example, a human can read legends on such a shelf even when external lights are off in an area of a facility around a rack on which the shelf is mounted.

Moreover, frontal illumination of a face plate as described above enables legend(s) on the face plate to be formed of a smaller font than legends used on prior art face plates, due to improved visibility and legibility. Use of smaller fonts in turn permits circuit boards and shelves that house such circuit boards to be made smaller than prior art known to the current inventors. Accordingly, in many embodiments of the invention, a shelf of electronic equipment implements frontal illumination of legend(s) on a face plate. Frontal illumination of a shelf's faceplate is believed to be nowhere disclosed or rendered obvious by any prior art known to the inventor(s) of the current patent application.

BRIEF DESCRIPTION OF THE FIGURES

FIG. 2B illustrates a method in accordance with the invention.

FIG. 3A illustrates, in a three-dimensional perspective view, a portion of a shelf in accordance with the invention wherein a bezel's exterior surface overhangs a face plate of a circuit board in the shelf.

FIG. 3B is a layout showing a counter-clockwise arrangement of four portions thereof, namely FIGS. 3B1, 3B2, 3B3 and 3B4 that together provide a three-dimensional perspective view of the shelf of FIG. 3A.

FIGS. 3B1, 3B2, 3B3 and 3B4 are respectively the top-left, bottom-left, bottom-right and top-right portions of FIG. 3B.

FIGS. 4A and 4B are similar to FIG. 3A and illustrates alternative embodiments of a shelf in accordance with the invention wherein a bezel's exterior surface overhangs a face plate of a circuit board in the shelf.

FIG. 5A is a front view of a shelf of the type shown in FIG. 3B with the addition of a section line A-A along which is shown a cross-sectional view in FIG. 5B.

FIG. 5B is a layout showing a counter-clockwise arrangement of four portions thereof, namely FIGS. 5B1, 5B2, 5B3 and 5B4 that together provide a cross-sectional view along section line A-A of FIG. 5A.

FIGS. 5B1, 5B2, 5B3 and 5B4 are respectively the top-left, bottom-left, bottom-right and top-right portions of FIG. 5B.

FIG. 5C is a layout showing a counter-clockwise arrangement of four portions thereof, namely FIGS. 5C1, 5C2, 5C3 and 5C4 that together provide another cross-sectional view of a shelf of the type shown in FIG. 5B.

FIGS. 5C1, 5C2, 5C3 and 5C4 are respectively the top-left, bottom-left, bottom-right and top-right portions of FIG. 5C.

DETAILED DESCRIPTION

In accordance with the invention, a shelf (also called "chassis") for use in a rack of electronic equipment in a communication network provides frontal illumination of a face plate on the shelf.

Specifically, in several embodiments of the invention, a chassis of electronic equipment includes a circuit board 220 (FIG. 2A) that supports an electronic component 232 and a face plate 222. Face plate 222 (e.g. formed of opaque plastic) has an exterior surface 221. Electronic component 232 may be mounted on a printed circuit board (PCB) of the type used in a communication network, such as a line card of a router or switch or a processor card of a server computer. Accordingly, circuit board 220 includes a PCB 277 in addition to electronic component 232 and the face plate 222.

An electronic component whose legend is being illuminated as described herein may be either permanently or temporarily attached to PCB 277, depending on the embodiment. In one illustrative embodiment, electronic component 232 is an LED (also called "indicator LED") that is permanently mounted on PCB 277. Note that an indicator LED, which is typically a color LED, normally operates at low power, e.g. less than 60 milliwatts. Such an indicator LED is of a different type, relative to a lighting LED (e.g. white LED) that is used in some embodiments, as a source of light for frontal illumination of a face plate.

Figure 3C:
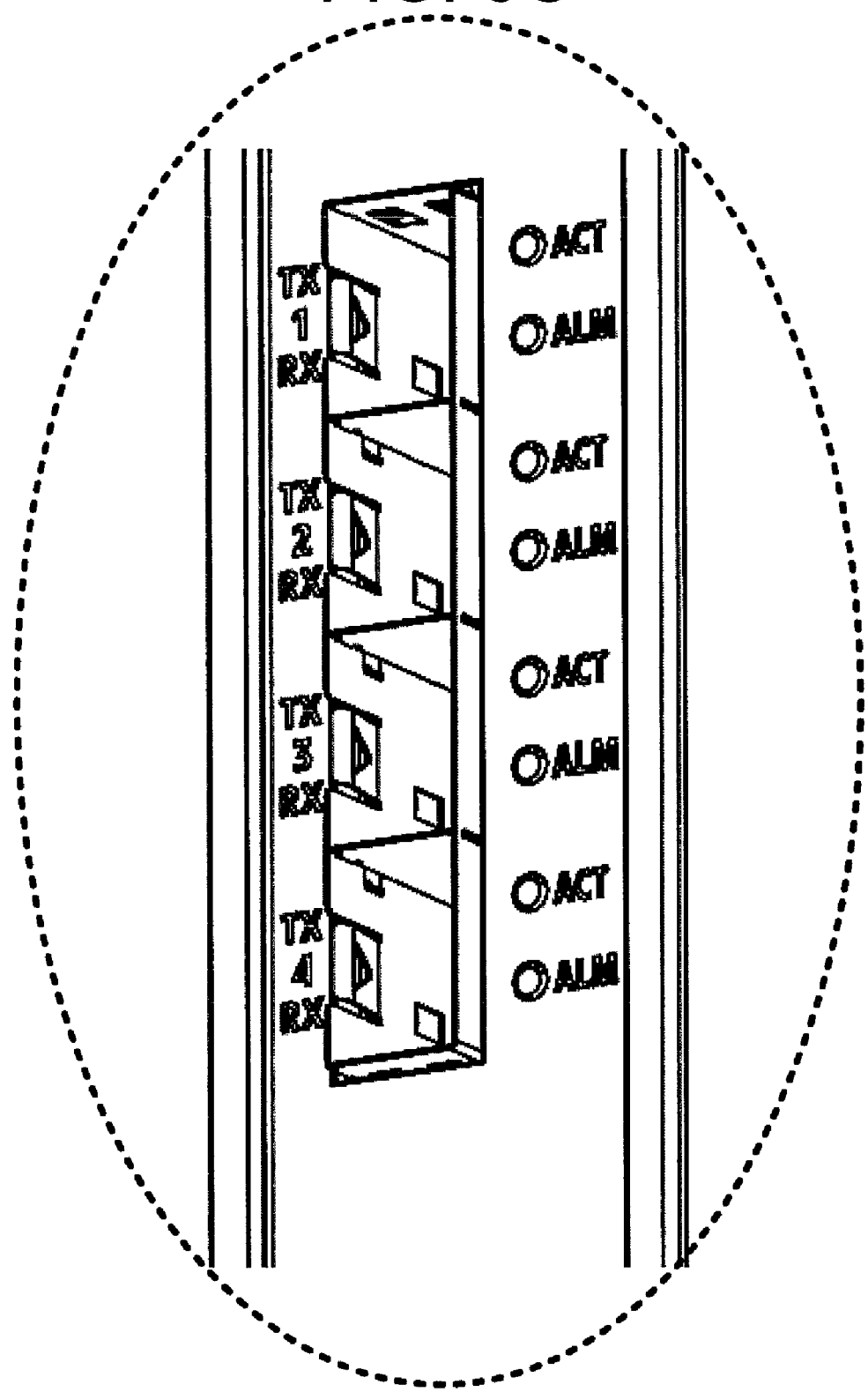
FIG. 3C is an enlarged version of a region labeled 3C in FIG. 3B2.
Figure 3D:
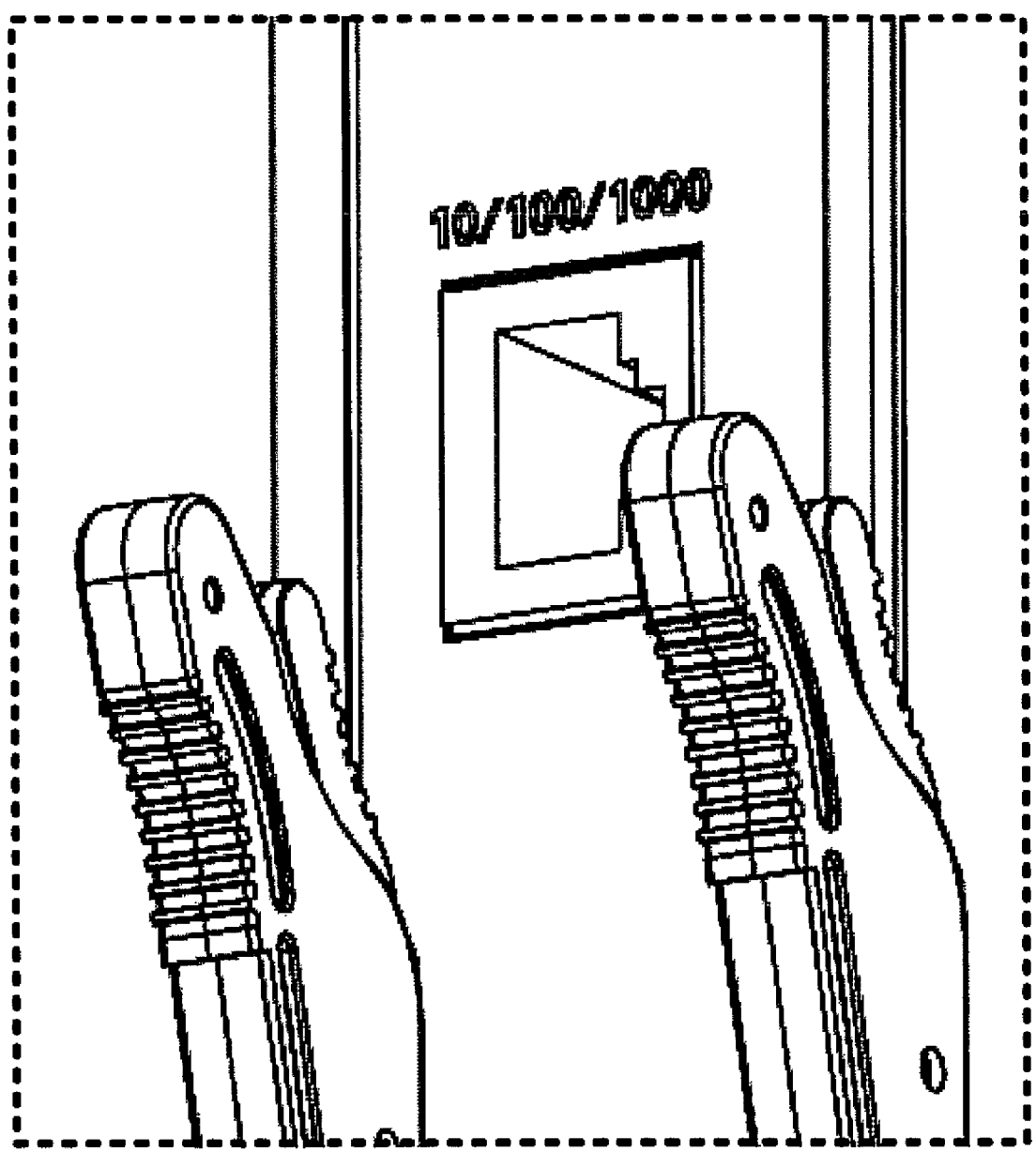
FIG. 3D is an enlarged version of a region labeled 3D in FIG. 3B2.
Figure 3E:
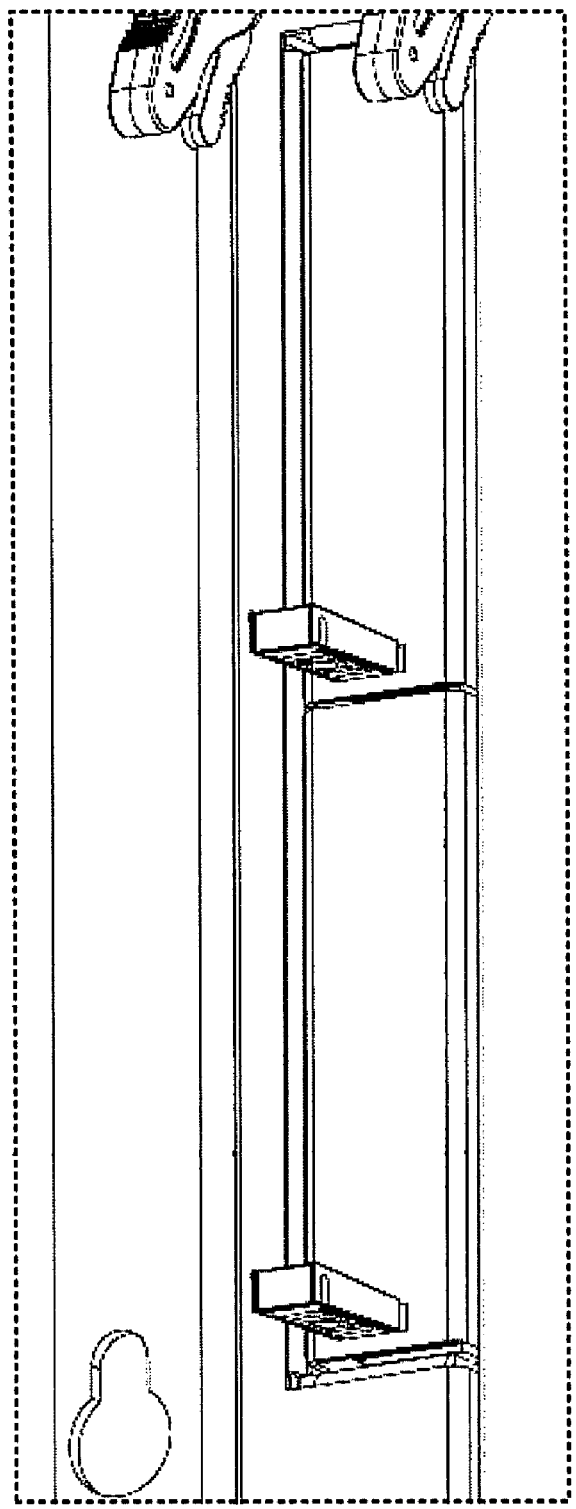
FIG. 3E is an enlarged version of a region labeled 3E which is split across FIGS. 3B1 and 3B2.
Figure 3F:
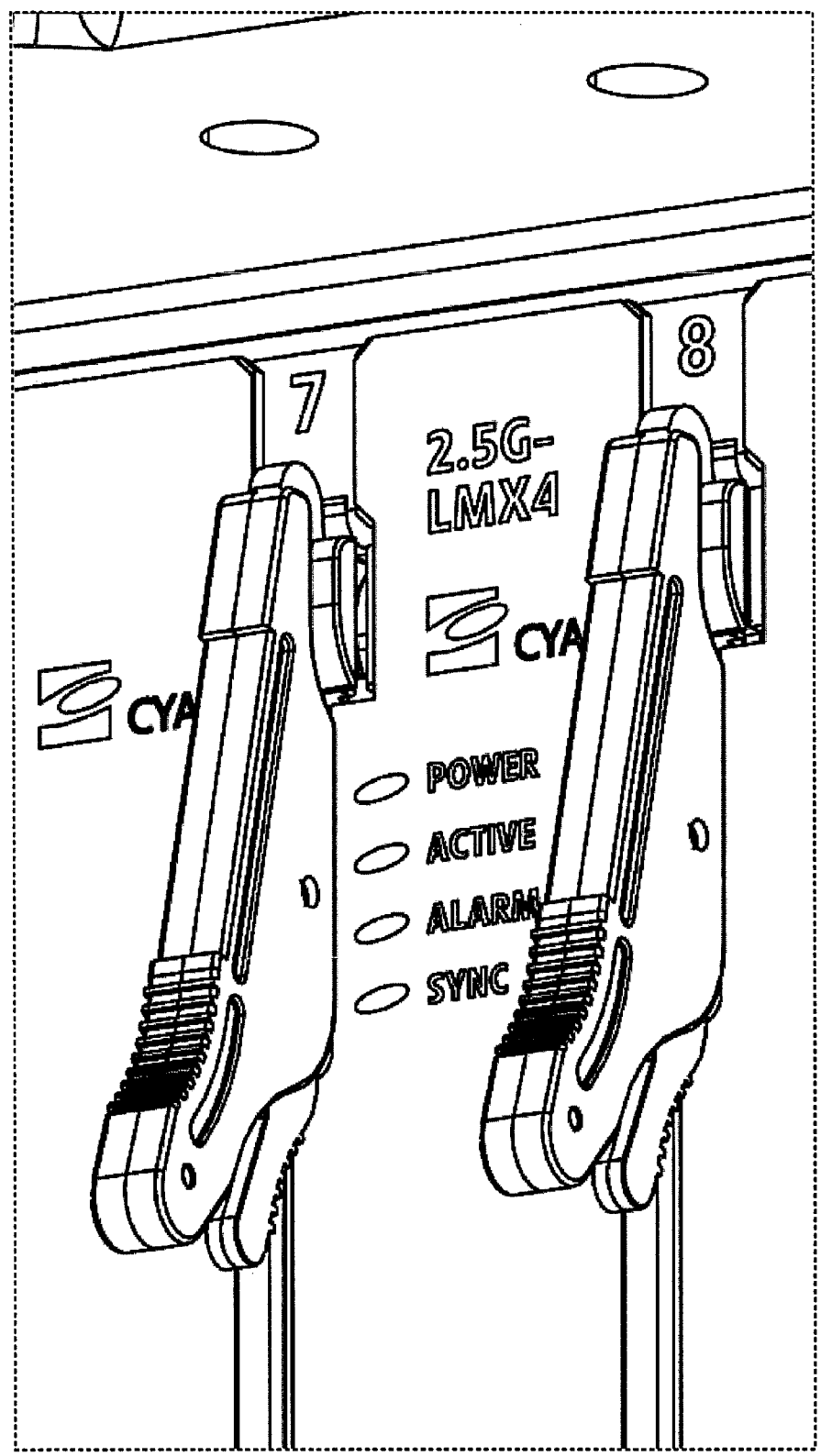
FIG. 3F is an enlarged version of a region labeled 3F in FIG. 3B1.

In another illustrative embodiment, electronic component 237 is removably attached to PCB 277 and conforms to a predetermined industry standard for a physical interface. One example of an industry-standard electronic component in a frontally-illuminated face plate is a small form-factor pluggable (SFP) transceiver, such as an optical transceiver used in a 2.5 Gigabit per second link in conformance with Ethernet and/or SONET/SDH and/or Fiber Channel protocols (see FIG. 3C) In yet another illustrative embodiment, an electronic component is removably attached to a circuit board but is of a custom design, such as a printed circuit board that is housed in a subassembly (also called "daughter card"), and mounted through an opening in a frontally-illuminated face plate in accordance with the invention (see FIG. 3E). Yet another example of electronic component 232 is a jack as illustrated in FIG. 3D.

Chassis 200 (FIG. 2A) also includes a bezel 210 (e.g. formed of translucent plastic) that has its own exterior surface 211. Bezel exterior surface 211 in accordance with the invention extends in a predetermined direction transverse to faceplate exterior surface 221, when circuit board 220 is mounted in a slot defined by a housing (not shown) of chassis 200.

In some embodiments, faceplate exterior surface 221 is vertical and bezel's exterior surface 211 is horizontal (which enables frontal illumination from above or below the face plate), although in other embodiments faceplate exterior surface 221 is horizontal and bezel's exterior surface 211 is vertical (which enables frontal illumination from the left side or right side of the face plate). A transverse orientation of the two external surfaces relative to one another is deliberately chosen in the just-described embodiments, in accordance with the invention, so that visible light or other electromagnetic radiation from bezel 210 forms a spot 242 on face plate 222, incident thereon from a region in space located in front of face plate 222.

Note that bezel 210 of several embodiments encloses a source 241 of electromagnetic radiation, for example a light emitting diode (LED) of the type commonly used in solid state lighting (such as a flash light, a traffic light, or bicycle front light). Hence, an example of source 241 is a white LED which includes a blue LED packaged with phosphor to convert energy from the blue LED to a longer wavelength. The just-described white LED is used in bezel 210 of some embodiments as a "lighting LED", which is of a different type relative to an indicator LED commonly used on face plate 222 to indicate status of circuitry in a PCB attached to the face plate. A lighting LED, if present in bezel 210 is also referred to herein as a "bezel LED". Note that source 241 can even include two laser(s) with complimentary wavelengths, in an alternative embodiment. During normal operation, electromagnetic radiation generated by source 241 (e.g. in the form of white light) exits bezel 210 through an opening 243 in bezel exterior surface 211, to form the above-discussed spot 242. Transverse orientation of a bezel surface and a face plate surface as illustrated in FIG. 2A results in frontal illumination, in many embodiments of a chassis of electronic equipment in accordance with the invention.

In several embodiments, spot 242 overlaps and illuminates at least a legend 233 located on exterior surface 221 of face plate 222. In some embodiments, located adjacent to legend 233 on face plate 222 is an opening 231 that is also illuminated by spot 242. Opening 231 in the just-described embodiments is located inline with at least a portion of electronic component 232. In the just-described embodiments, legend 233 is descriptive of a function performed by electronic component 232. In one embodiment, electronic component 232 is a color LED (light emitting diode) that is operated to emit different colors to indicate different status of alarms, e.g. a green color indicates there are no alarms and a red color indicates presence of at least one alarm.

Note that in the just-described embodiment, frontal illumination is provided to legend 233. Even if an LED in electronic component 232 is adjacent to legend 233, legend 233 receives a negligible amount of light from its adjacent light source. Accordingly, such an LED if present on a face plate, is also referred to herein as a "faceplate LED." A majority of light (e.g. >50%) incident on legend 233 originates from a bottom surface of bezel 210. Note that although in the embodiment shown in FIG. 2, the majority of light incident on legend 233 is received from an opening 243, in other embodiments bezel 210 does not have any openings, and instead bezel 210 has a transparent region (also called window) in the same location as the opening 243 described herein.

Figure 2A:
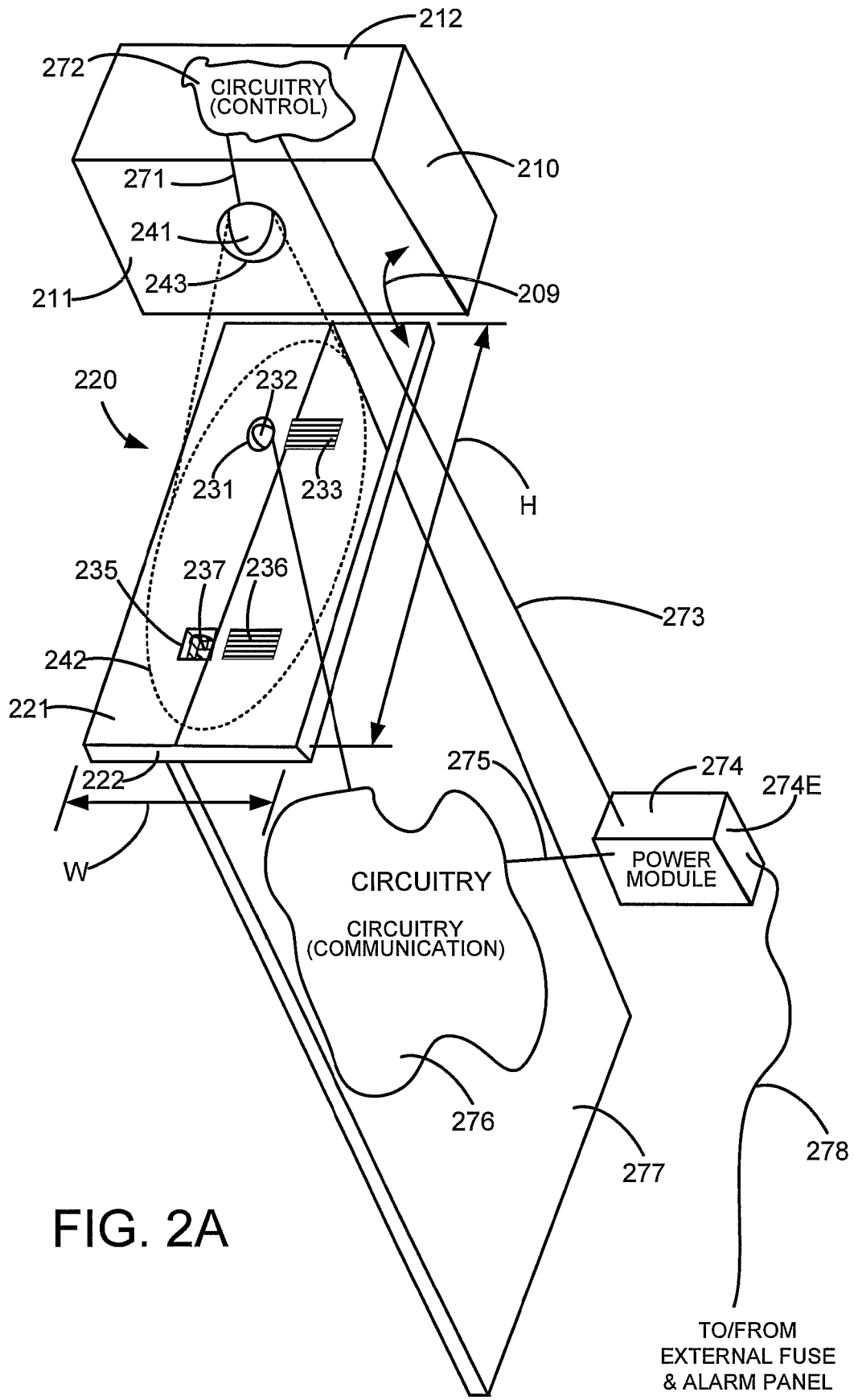
FIG. 2A illustrates, in a conceptual view, a shelf 200 including a bezel with an exterior surface 211 that in accordance with the invention extends transverse to another exterior surface 221 of a face plate 222 of a circuit board 220 in the shelf 200.

In the embodiment illustrated in FIG. 2A, face plate 222 carries an additional legend 236 that is located adjacent to an additional opening 235. Spot 242 is designed to be sufficiently large to overlap and illuminate legend 236 and opening 235. Opening 235 is located inline with a jack 237 that is included in circuit board 220. Jack 237 receives a plug of an external cable (not shown), e.g. and connects the external cable to circuitry (not labeled) within circuit board 220. Jack 237 may conform to, for example, an industry-standard physical interface, such as RJ45 and/or USB and/or RS-232. In one example, legend 236 of jack 237 identifies a protocol, e.g. a string of characters "10/100/1000" used as a legend in FIG. 3D denotes Ethernet. Specifically, although only one jack is shown in FIG. 2A, there may be any number of such ports (e.g. 20 ports) on circuit board 220 and each may be individually identified by its respective legend in an illustrative embodiment.

In certain embodiments wherein bezel 210 is positioned in an upper region of the chassis which is above circuit board 220, the bezel exterior surface 211 overhangs faceplate exterior surface 221 and therefore forms an overhanging roof of surface 221. Note that in alternative embodiments, bezel 210 is positioned in a lower region of the chassis which is below circuit board 220. Regardless of whether positioned in an upper region or a lower region, bezel exterior surface 211 extends in a transverse direction relative to faceplate exterior surface 221. The direction of surface 211 relative to surface 221 is at a predetermined angle 209 therebetween (also called "transverse" angle).

In some embodiments, the transverse angle 209 is 90°, although in other embodiments the transverse angle 209 may be smaller or larger than 90° by up to, for example 40° (e.g. angle 209 may be 130° or may be 50° or any angle within a predetermined range between 130° and 50°). The just-described values of the predetermined range are merely exemplary, as will be readily apparent to the skilled artisan in view of this disclosure. Specifically, regardless of the specific position of a light source and a corresponding transverse angle value in some embodiments, illumination reaches the face plate exterior surface in any direction from the front of the face plate.

Moreover, in certain illustrative embodiments, angle 209 is nominally of a specified value (e.g. 90°), although in practice a process used to manufacture bezel 210 (e.g. injection molding) requires this value to be greater (e.g. 92°). Furthermore, assembly of the bezel onto a chassis may be within a specified tolerance that in turn affects the precise value of the transverse angle. For these additional reasons, any value for transverse angle 209 may be used, depending on the embodiment.

In some embodiments, a vendor of a communication chassis performs a method 250 illustrated in FIG. 2B. Specifically, an employee of the vendor inserts in act 251a circuit board 220 (FIG. 2A) having a face plate 222 into a slot defined by a housing of the chassis. Act 251 may be repeated multiple times as indicated by branch 252 in FIG. 2B. An employee of the vendor also performs an act 253 (FIG. 2B) by attaching to the housing a bezel 210 (FIG. 2A) having a surface 211 that extends in a direction transverse to the face plate 222. In several embodiments, acts 251 and 253 are performed in the reverse order, as illustrated by branch 257, i.e. a bezel is initially attached to the housing, followed by insertion of one or more circuit boards into the housing.

After completion of assembly of the chassis as per acts 251 and 253, an act 255 may be performed, e.g. during testing by the vendor's employee and/or by a customer's employee in a facility that hosts rows of racks of shelves of the type shown in FIG. 2A. For example, in act 255 a light source enclosed by the bezel is operated by a human turning on power to the assembled chassis, and the transverse orientation of surfaces 211 and 221 (FIG. 2A) causes light exiting from surface 211 of the bezel to fall on and illuminate surface 221 of the face plate. The illumination of faceplate surface 221 from light exiting bezel surface 211 enables the human to read legend(s) on the face plate, and take appropriate action. For example, if a face plate LED indicates that there is no power, the human may remove and re-insert the circuit board to eliminate an issue that may be arising from poor electrical contact between the circuit board and a connector in a backplane (or midplane) of the chassis.

In some embodiments, a circuit board has a jack which provides an external interface to circuitry in the circuit board. Hence, either before or after act 255, another act 259 is performed, to insert into a jack in the circuit board, a plug of a cable. The cable (not shown) constitutes a link in the communication network. Hence, the cable may connect the chassis (either electrically or optically) to another network element within the communication network. Alternatively, the cable may connect the chassis (either electrically or optically) to a multiplexer (not shown) that in turn is connected to an end user (also not shown).

FIGS. 3A and 3B illustrate an embodiment of the invention, wherein a bezel 310 is mounted extending outwards from housing 306 to provide frontal illumination to the housing's surfaces 321A, 321B, by directing thereon light exiting from an overhanging surface 311 of bezel 310. Note that FIG. 3A is an enlarged view of a top-right corner in FIG. 3B. Chassis 300 of this embodiment holds electronic equipment used in a communications network, and chassis 300 is dimensioned to fit within a telco rack of the type illustrated in FIG. 1.

Note that several of the reference numerals in FIG. 3A are obtained from corresponding reference numerals in FIG. 2A by adding 100. Moreover, the letters "A", "B", "C" and "D" are added to the reference numerals in FIG. 3A to distinguish among multiple items that can be interchanged relative to one another in the invention. Note that although circuit boards in a chassis 300 may be interchanged, they are not identical. The circuit boards of chassis 300 may be different from each other and their individual identities are apparent from legends 333A-333C on their respective face plates. To provide illumination so that legends 333A-333C can be read by a human in a dark environment, a bezel 310 is mounted on chassis 300, with a bottom surface 311 that overhangs a front surface formed by surfaces 321A-321Z of corresponding face plates (not labeled) in chassis 300.

Bezel 310 (FIG. 3A) of this embodiment encloses as many light sources (not shown in FIG. 3A) as the number of openings in surface 311 of bezel 310. When operated, the light sources cast beams of light through respective openings 343A, 343B, 343C and 343D that in turn form spots 342A, 342B, 342C and 342D on respective surfaces 321A, 321B, 321C and 321D of the corresponding circuit boards. Openings 343A-343D in the bezel bottom surface 311 are laterally spaced from respective surfaces 321A, 321B, 321C and 321D of the corresponding circuit boards by a horizontal distance 308 that is predetermined.

Distance 308 is selected by a designer of chassis 300 to be sufficiently large for light exiting an opening 343A to form a spot 342A that extends sufficiently along surface 321A to cover any legends thereon that are to be illuminated. In the embodiment shown in FIG. 3A, a farthest tip of spot 342A reaches a vertical distance 307 from bezel 310. Vertical distance 307 is predetermined by the vertical extent of legends on an upper region of surface 321A.

In addition to bezel 310 extending from the chassis front surface (formed by surfaces 321A-321Z) at the top of chassis 300, a cable management tray 390 also extends from the chassis front surface and tray 390 overhangs a fan tray 395. Tray 390 is used to neatly arrange one or more cables that may be connected to jacks in surfaces 321A-321Z (such as a fiber optic cable) so that cables of one circuit board in chassis 300 do not become entangled with cables of another circuit board in chassis 300.

Although only one legend 333A is shown on surface 321A, there may be any number of such legends, e.g. four legends are shown (not labeled) on surface 321B. The legends on surfaces 321A-321Z of chassis 300 may be text or graphics or some combination thereof. Examples of text legends that are used in one embodiment include "POWER", "ALARMS", "SYNC" and "ACTIVE" and the corresponding face plate LEDS are connected to four individual subsystems (not shown) respectively within circuitry in a circuit board 321X (see FIGS. 5A-5C), such as a power subsystem, an alarms subsystem, a transceiver subsystem and a data transfer subsystem. Each subsystem indicates status of its own internal operation by transmitting an appropriate electrical signal on an electrical line (formed by a metallic trace on a PCB) to the respective LED, e.g. to operate the LED to generate light of a red color, a green color or an orange color, or any other color.

In one embodiment, a spot's vertical extent 307 (FIG. 3A) is selected to be one-third of the total height H (FIG. 2A) of a faceplate surface, because chassis 300 is designed to have legends and/or electronic devices only in the top one-third region of the faceplate surface, as shown by surface 321A in FIG. 3A. In this illustrative example, height H (see FIG. 2A) is 14 inches, and distance 307 (see FIG. 3A) is 3 inches. Moreover, in this illustrative example, distance 308 (FIG. 3A) is 0.9 inch. In another embodiment, the spot's vertical extent 307 (FIG. 3A) is the entire height H (FIG. 2A) of a face plate 222, because legends and/or electronic devices may be present anywhere on face plate 222 depending on the type of circuit board as illustrated in FIG. 3B.

Note that the invention may be practiced without any electronic component being illuminated on a face plate as illustrated by surfaces 321C and 321D in FIG. 3A. Specifically, surface 321C has only a legend 333C that is illuminated by light from its corresponding opening 343C in overhanging surface 311; note that faceplate surface 321C does not have any opening for any electronic component. For example, surface 321C in one embodiment is of a face plate in a circuit board that requires no field service by a human in a facility that hosts rows of racks of such shelves. In this example, legend 333C includes the vendor's name and/or a name of the circuit board.

Also, note that the invention may even be practiced without any legend on a face plate as illustrated by surface 321D in FIG. 3A. Specifically, surface 321D has no legend to be illuminated by light from its corresponding opening 343D in overhanging surface 311; note that surface 321D does not also have any electronic component. For example, surface 321D in one embodiment is of a face plate that is not attached to any circuitry, e.g. the face plate is used to cover up (i.e. close) an unused slot in chassis 300. Hence, method 250 (FIG. 2B) includes an additional act (not shown) of removing such a face plate prior to performing act 251.

Figure 4B:
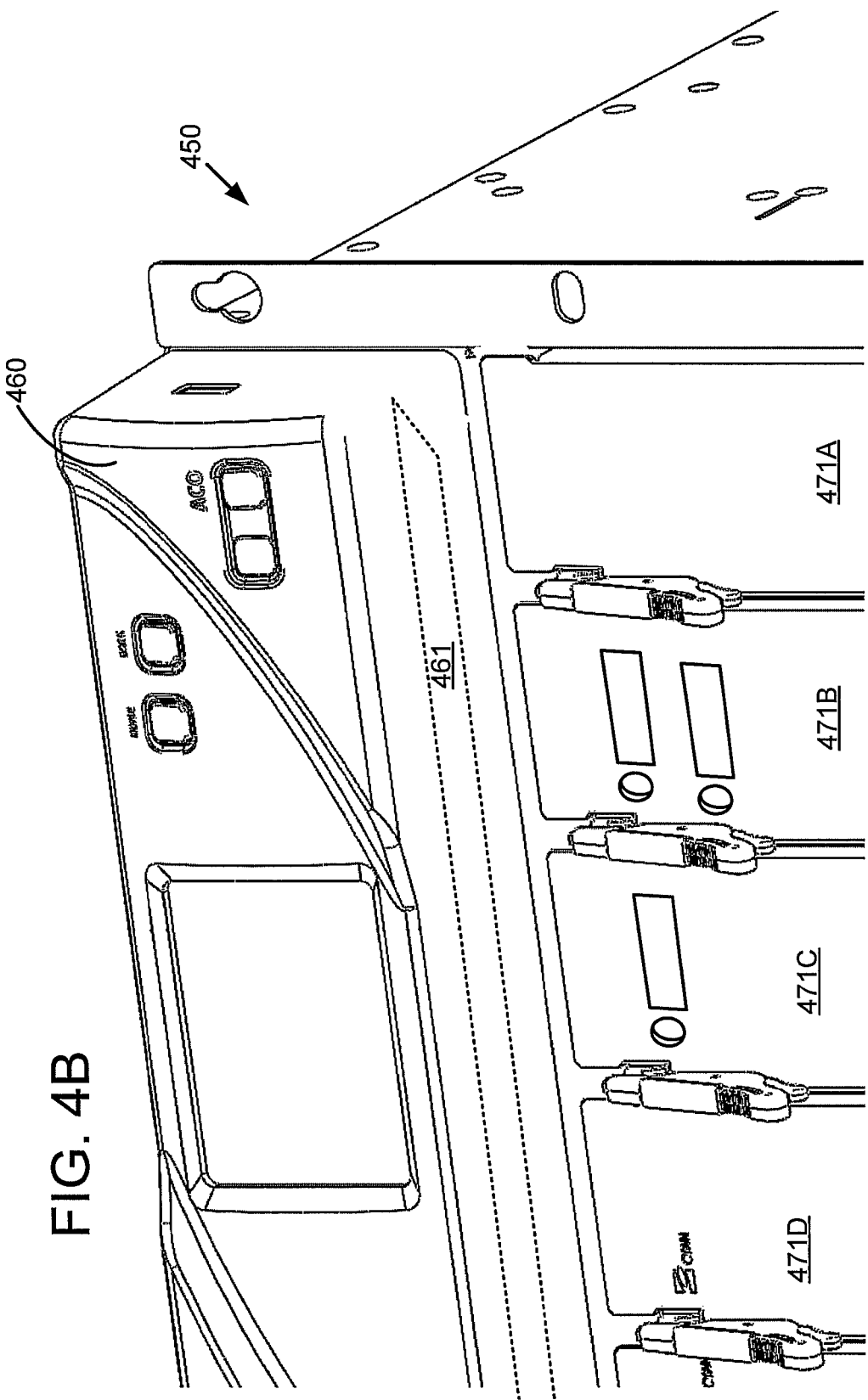

Note that in FIG. 3B, four circuit boards 321A-321D are of double width, relative to remaining circuit boards in chassis 300, such as board 321Z. In this embodiment (FIG. 3B), each circuit board is illuminated by a light source through an opening aligned to illuminate a central region on the respective face plate, regardless of width of the circuit board. Specifically, in the embodiment shown in FIGS. 3A and 3B, each face plate is illuminated by its own dedicated light source independent of any other face plate. However, as will be apparent to the skilled artisan in view of this disclosure, the number of light sources and/or location of openings on surface 311 relative to the legends on the face plates of chassis 300 are different in other embodiments, as illustrated in FIGS. 4A and 4B.

In the embodiment illustrated in FIG. 4A, each face plate is illuminated by a pair of light sources. Specifically, each pair of light sources (not shown) includes a left light source that emits radiation through a left opening 443L to form a left spot 442L in a left portion of a face plate surface 421B, and a right light source emits radiation through a right opening 443R to form a right spot 442R in a right portion of the face plate surface 421B. Depending on the embodiment, spots 442L and 442R may or may not overlap one another.

Specifically, in some embodiments, the just-described two light sources are designed to individually illuminate two respective face plate surfaces (not shown) that are half as wide as face plate surface 421B. In the just-described embodiments, chassis 400 supports circuit boards of two widths, one width being two times as large the other. In an illustrative example, the width of surface 421B is 2.4 inches, and chassis 400 also supports 1.2 inch wide circuit boards.

In chassis 400 illustrated in FIG. 4A, left spot 442L overlaps (and illuminates) a left half 433L of a legend and right spot 442R overlaps (and illuminates) a right half 433R of the same legend. Moreover, left spot 442L overlaps and illuminates opening 431 which is adjacent to (and in the same row as) left half 433L of the legend. Accordingly, opening 431 is directly illuminated by the left light source but not by the right light source (both sources not shown, but illuminating through respective openings 443L and 443R). As will be apparent to the skilled artisan, rays of light from any given light source may reach beyond a corresponding spot, e.g. if the rays are reflected. Hence, a given light source in chassis 400 provides indirect illumination around the spot, in addition to directly illuminating the spot.

Although in some embodiments there is a one-to-one correspondence between light sources enclosed within a bezel and the face plates being illuminated, in other embodiments there is no correspondence. For example, FIG. 4B illustrates a chassis 450 wherein the bezel 460 has a diffusive element 461 (formed of partially transparent plastic) through which light is emitted to illuminate face plate surfaces 471A-471D. In one embodiment, a single light source in the form of a fluorescent tubelight (not shown) is enclosed within bezel 460, and the tubelight is located adjacent to diffusive element 461. In another embodiment, a set of incandescent light bulbs (not shown) are enclosed within bezel 460, also adjacent to diffusive element 461, number of bulbs being selected to ensure adequate illumination exits from diffusive element 461. Still another embodiment uses as a light source, any LED that can be operated at high power, e.g. greater than or equal to 1 watt, to provide high intensity illumination.

Figure 5D:
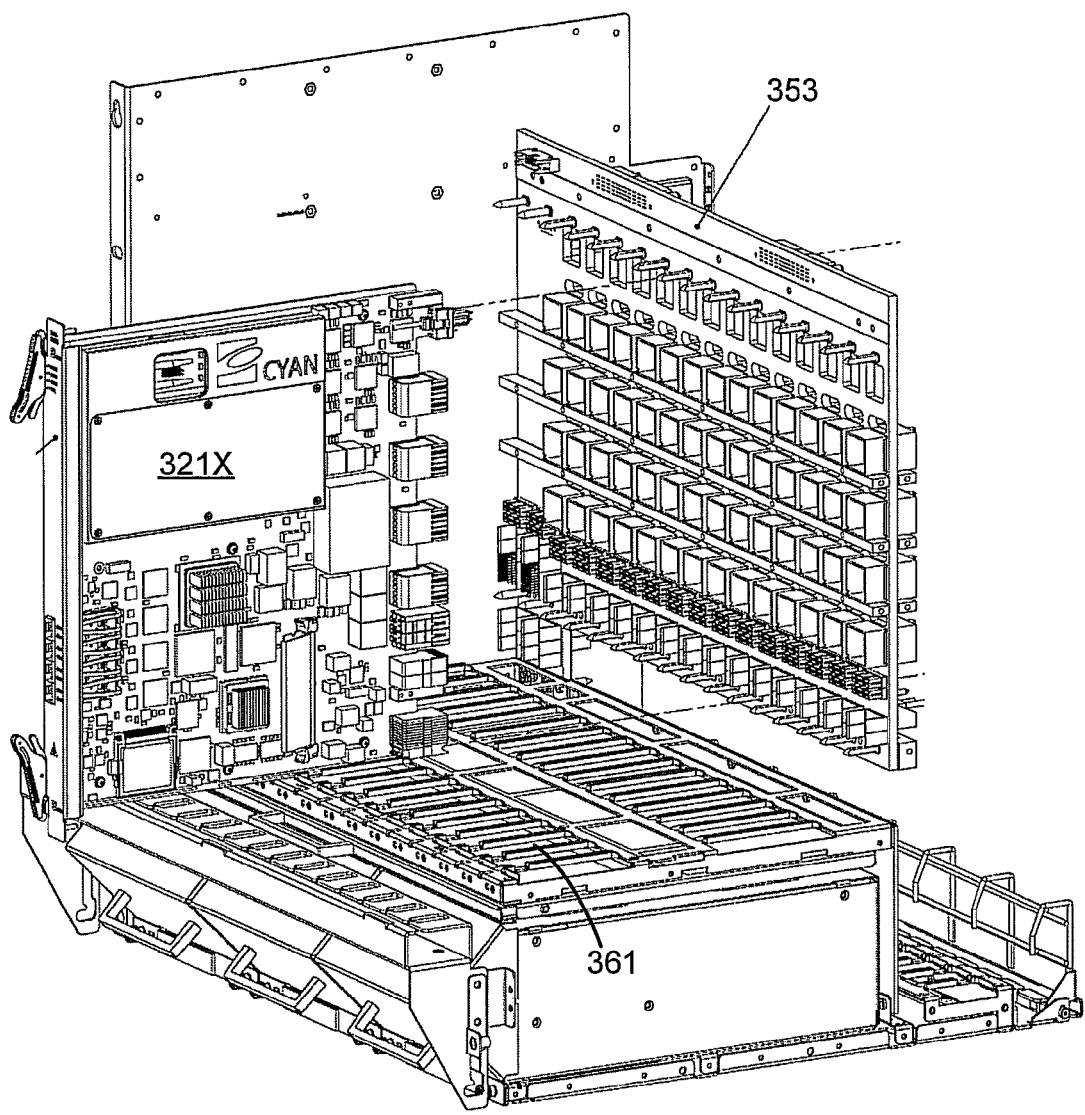
FIG. 5D is an exploded view of the shelf of FIG. 5A, wherein the bezel, a side portion and a rear portion of the shelf are removed to improve clarity.

Referring to FIGS. 5A-5C, circuit board 321X has four rows of LEDs and legends that are together identified by reference numeral 333X. Circuit board 321X also has four jacks 337A-337D that receive connectors of four cables (not shown) to provide four data interfaces to circuitry within circuit board 321X. Circuit board 321X is inserted into a slot defined between two guides of housing 306, namely a bottom guide 361 and a top guide 362. When fully inserted, circuit board 321X contacts a midplane 353 enclosed within housing 306. Midplane 353 has one or more pins and/or openings that mate with corresponding openings and/or pins on circuit board 321X as board 321X is inserted. Moreover, a connector 351 of board 321X mates with a corresponding connector 352 accessible at midplane 353 (e.g. through an opening therein).

In the illustrated embodiment, midplane 353 provides electrical power to circuit board 321X. Midplane 353 is electrically coupled to and receives electrical power from a power module 274 that in turn is connected by a cable 278 (FIG. 2A) at its exterior surface 274E, to an external fuse and alarm panel located outside the chassis. As illustrated in FIG. 2A, power module 274 may be directly connected by a power line 275 to circuitry 276 in PCB 277 of circuit board 321X. Hence, electrical devices 237 and 232 of the embodiment illustrated in FIG. 2A receive power from power module 274. Also as shown in FIG. 2A, power module 274 is further connected by a power line 273 to circuitry 272 in a PCB 671 (FIG. 6B) that in turn has a trace 271 on which power is supplied to lighting LED 241. As will be apparent to the skilled artisan in view of this disclosure, lighting LED 241 and electrical devices 232 and 237 are electrically coupled to and receive power from power module 274, and all these items are housed within a single chassis in accordance with the invention.

Figure 6A:
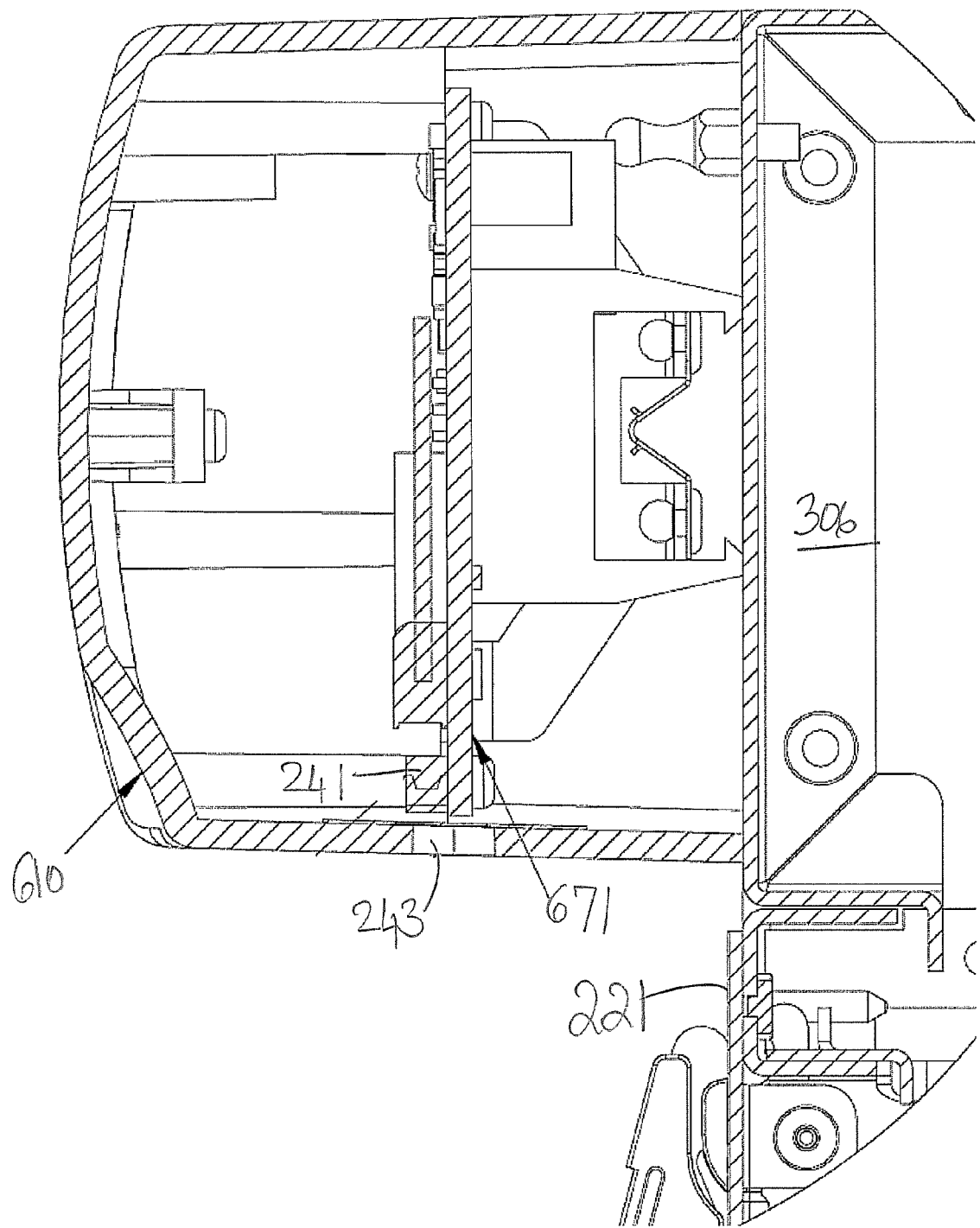
FIG. 6A is an enlarged version of a portion labeled 6A in FIG. 5C1.
Figure 6B:
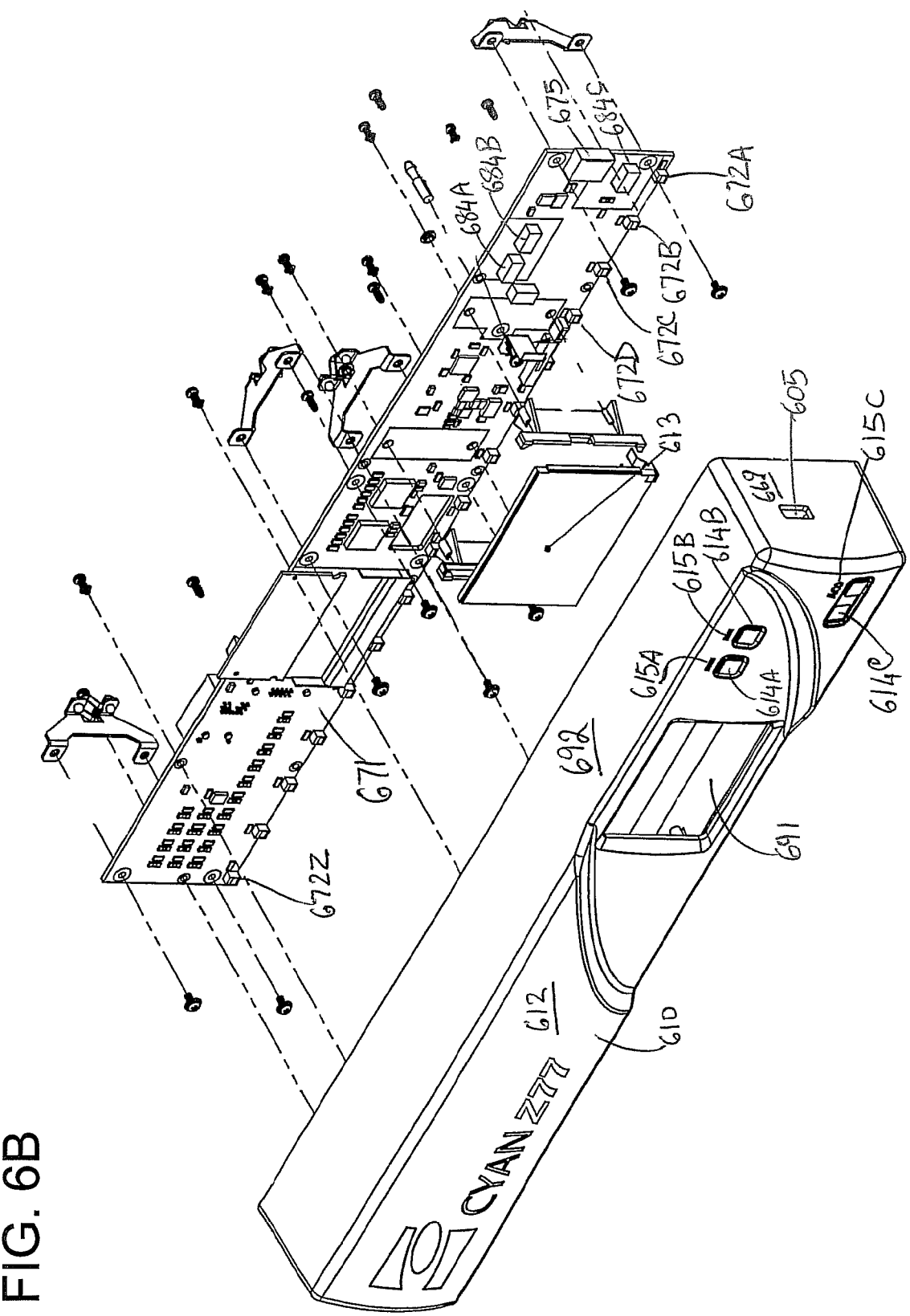
FIG. 6B illustrates an exploded view of a bezel used in a shelf of the type shown in FIGS. 3A and 3B, when viewed from top and front of the shelf.

One illustrative embodiment of bezel 210 is shown as bezel 610 in FIGS. 6A and 6B. Bezel 610 has a floor 691 in which are formed a number of openings (not shown) to accommodate a respective number of LEDs 672A-672Z. Floor 691 has a bottom surface (not visible in FIG. 6B) that is similar or identical to transverse surface 211 of FIG. 2A. LEDs 672A-672Z are right angle LEDs mounted on a printed circuit board (PCB) 671 that is inserted into a space defined by five walls of bezel 610. Specifically, in addition to floor 691, bezel 610 has a roof 692 that is opposite to the floor 691. Bezel 610 also has a front wall (not labeled) on which is formed surface 612 that is similar or identical to surface 212 in FIG. 2A. Bezel 610 also has two side walls that are separated from each other by the length of roof 692 and floor 691. Of the two side walls, one side wall 669 is visible in FIG. 6B.

Note that bezel 610 has several openings in its front wall and PCB 671 has other components, such as a touch-sensitive display 613, electronic devices 684A-684C and USB jack 675. When PCB 671 is mounted in bezel 610, electronic devices 684A-684C are visible through openings 614A-614C in a front surface 612 of bezel 610. Front surface 612 of bezel 610 has legends 615A-615C adjacent to openings 614A-614C. Side wall 669 has an opening 605 through which USB jack 675 is accessible from outside of the chassis. Electronic devices 684A and 684B are buttons which when operated enable a human to navigate forwards and backwards between screens displayed on display 613. Note that display 613 of one embodiment includes a liquid crystal display that is back lit. Electronic device 684C is an LED which displays the status of alarms in the chassis.

Accordingly, in some embodiments, a shelf of electronic equipment implements frontal illumination of legend(s) of electrical device(s) visible or accessible through a face plate. Frontal illumination of a faceplate of a shelf is believed to be nowhere disclosed or rendered obvious by any prior art known to the inventor(s) of the current patent application.

Numerous modifications and adaptations of the embodiments described herein will become apparent to the skilled artisan in view of this disclosure.

For example, some embodiments cast light from a bottom surface of a bezel on to legends on the housing of a chassis, such as legends 501I, 501J and 501K that respectively identify the slot number, such as 12$^{th}$ slot, the 11$^{th}$ slot and the 10$^{th}$ slot respectively in chassis 300 in FIG. 5A. Such frontal illumination of legends 501I, 501J and 501K may be either direct or indirect, depending on the embodiment. In the embodiment shown in FIG. 5A, light from bezel 310 illuminates at least three regions (a) a first region in which is located a combination 333X of LEDs and legends on circuit board 321X, (b) a second region in which are located jacks 337A-337D and their respective legends (not labeled in FIG. 5A), and additionally (c) a third region in which is located a legend 501X of the slot.

Note that the first and second regions are located on circuit board 321X, but the third region is located on housing 306. Frontal illumination of housing legends 501I, 501J and 501K improves human legibility of slot numbers which in turn reduces mistakes that may otherwise, for example if a circuit board is inserted into an incorrect slot in the chassis. Note that bezel 310 may have legends that are back lit, such as legend 581 denoting a vendor name 'CYAN' and legend 582 denoting a product name 'Z77'.

Figure 1:
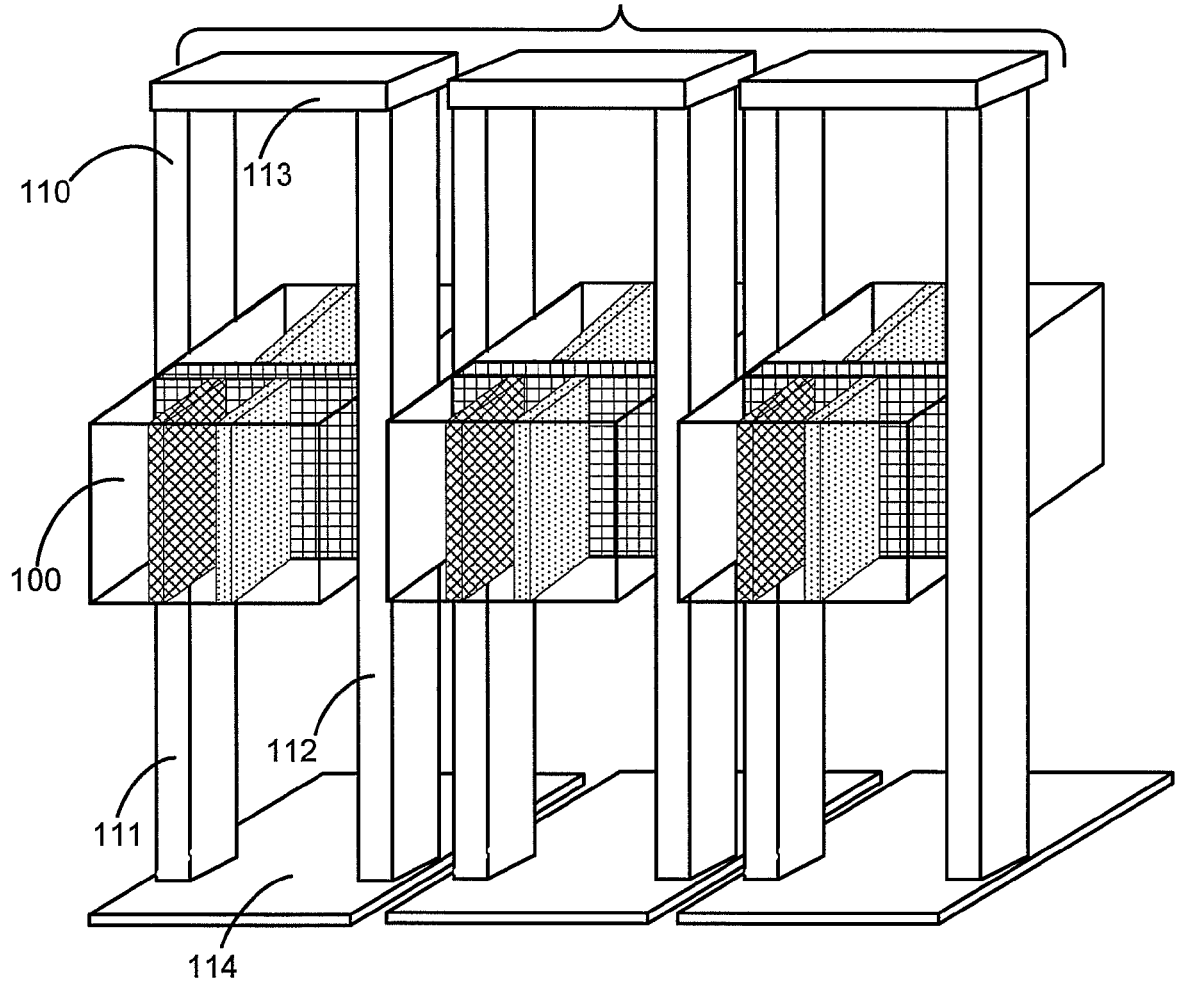
FIG. 1 illustrates, a row of prior art racks inside a room of a telco central office or a service provider's data center.

Also, note that a bezel in accordance with the invention need not enclose a lighting LED, as illustrated by an alternative embodiment shown in FIG. 5B1 that provides frontal illumination of a face plate using indirect lighting. Specifically, circuit board 321X (FIG. 5B1) has a lighting LED 396 oriented to direct light upwards through an opening 397 in a card guide 361 when circuit board 321X is mounted in the chassis. In this alternative embodiment, a reflector 398 is located in housing 306 in a path of light from LED 396 and reflects the light to another reflector 399 that is mounted on a PCB 391 in bezel 310. Reflector 399 reflects the light from reflector 398 through the above-described opening 243 towards an external surface 221 of face plate 222. Reflectors 398 and 399 can be mirrors or prisms, depending on the embodiment. Note that in another embodiment, the chassis does not have a bezel and instead a portion of housing 306 has surface 211.

Numerous modifications and adaptations of the embodiments described herein are encompassed by the scope of the invention.

What is claimed is:
1. A chassis comprising:
    an electronic device supported on a first exterior surface of a housing of the chassis;
    wherein the housing comprises a second exterior surface extending in a transverse direction from the first exterior surface;
    a source of electromagnetic radiation enclosed by the housing;
    wherein electromagnetic radiation from the source exits the housing through the second exterior surface and illuminates at least a portion of the electronic device when the source is operated; and
    a power module located within the housing;
    wherein each of the electronic device and the source of electromagnetic radiation are electrically coupled to the power module;
    wherein the housing has a third exterior surface formed by at least a portion of the power module; and
    wherein a cable from the power module is electrically connected to an external fuse and alarm panel.
2. A chassis comprising:
    a housing;
    a plurality of first connectors enclosed within said housing;
    a plurality of circuit boards located in slots of said housing and comprising a plurality of second connectors mated with the first connectors in the housing;

wherein each circuit board has at least one jack located at a first exterior surface of the housing;
wherein each circuit board is transverse to the first exterior surface of the housing;
wherein a plurality of legends are located on the first exterior surface, each legend comprising text descriptive of a function performed by a circuit board having a jack;
wherein the housing comprises a second exterior surface extending in a transverse direction from the first exterior surface;
a source of electromagnetic radiation enclosed by the housing;
wherein electromagnetic radiation from the source exits the housing through the second exterior surface and illuminates at least one legend on the first exterior surface when the source is operated; and
a power module located within the housing;
wherein each circuit board and the source of electromagnetic radiation are electrically coupled to the power module.

3. The chassis of claim 2 wherein:
the first exterior surface has an opening;
the opening is located adjacent to the legend and the jack is located in said opening.

4. The chassis of claim 2 further comprising:
a face plate;
wherein the face plate forms a portion of the first exterior surface of the housing.

5. The chassis of claim 2 wherein:
the source of electromagnetic radiation comprises a light emitting diode.

6. The chassis of claim 2 wherein:
the electronic device comprises a light emitting diode.

7. The chassis of claim 2 wherein:
the electronic device comprises a jack accessible through an opening in the first exterior surface of the housing to receive a plug of another cable.

8. The chassis of claim 2 wherein:
the electronic device comprises a transceiver.

9. The chassis of claim 2 wherein:
the source of electromagnetic radiation is of a first type; and
the electronic device comprises an additional source of electromagnetic radiation, the additional source being of a second type.

10. The chassis of claim 2 wherein:
the source of electromagnetic radiation comprises a laser.

11. The chassis of claim 2 wherein:
the second exterior surface has an opening; and
the electromagnetic radiation exits from the opening to illuminate the portion of the electronic device.

12. A method comprising:
inserting into a slot in a chassis, a circuit board that supports an electronic device, so that a portion of the electronic device is located at a first exterior surface of a housing of the chassis;
attaching a bezel that comprises a second exterior surface of the housing extending in a predetermined direction transverse to the first exterior surface;
wherein the bezel includes a source of electromagnetic radiation;
wherein each of the electronic device and the source of electromagnetic radiation are electrically coupled to a power module in the chassis;
wherein electromagnetic radiation from the source exits the housing through the second exterior surface and illuminates at least a portion of the electronic device when the source is operated;
wherein the housing has a third exterior surface formed by at least a portion of the power module;
wherein the first exterior surface has an opening and the electronic device comprises a jack; and
inserting into the jack, through the opening, a plug of a cable.

13. The method of claim 12 wherein:
a legend is located on the first exterior surface adjacent to said portion of the electronic device; and
the legend is illuminated by the electromagnetic radiation.

14. The method of claim 13 wherein:
the legend comprises text descriptive of a function performed by the electronic device.

15. The method of claim 12 wherein:
the first exterior surface has an opening; and
the opening is located adjacent to the legend and inline with at least a portion of the electronic device.

16. The method of claim 12 wherein:
the second exterior surface has an opening;
the opening is located adjacent to the source of electromagnetic radiation; and
the electromagnetic radiation from the source passes through the opening.

* * * * *